United States Patent [19]

Alon et al.

[11] Patent Number: 5,537,385
[45] Date of Patent: Jul. 16, 1996

[54] READING MULTIPLE TRACKS DATA WITH A MICROSCOPE SCANNER AND A TWO MIRROR LIGHT BEAM FOCUS UNIT

[76] Inventors: Amir Alon, 5, 19th Street, Yahud; Shlomo Shapira, 27, Degel Reuvn St.; Itzhak Katz, 7, Gilad Street, both of Petach Tikva, all of Israel

[21] Appl. No.: 394,425

[22] Filed: Feb. 24, 1995

Related U.S. Application Data

[62] Division of Ser. No. 43,254, Apr. 6, 1993, Pat. No. 5,426,623.

[30] Foreign Application Priority Data

Apr. 10, 1992 [IL] Israel ......................................... 101570

[51] Int. Cl.$^6$ ............................... G11B 11/18; G11B 7/00
[52] U.S. Cl. ............................. 369/119; 369/32; 369/102; 369/103; 369/112
[58] Field of Search ............................. 369/119, 32, 112, 369/102, 47, 48, 44.14, 103, 118

[56] References Cited

U.S. PATENT DOCUMENTS

| | | | |
|---|---|---|---|
| 3,748,015 | 7/1973 | Offner | 359/366 |
| 3,805,275 | 4/1974 | Kiemle et al. | 359/12 |
| 4,135,251 | 1/1979 | Ruell | 359/26 |
| 4,298,974 | 11/1981 | Tsunoda et al. | 369/45 |
| 4,428,647 | 1/1984 | Sprague et al. | |
| 4,486,870 | 12/1984 | Pettigrew et al. | 369/32 |
| 4,536,866 | 8/1985 | Jerome et al. | 369/112 |
| 4,581,529 | 4/1986 | Gordon | 369/112 |
| 4,841,514 | 6/1989 | Tsuboi et al. | 369/100 |
| 5,033,043 | 7/1991 | Hayakawa | 369/121 |
| 5,065,387 | 11/1991 | Roth et al. | 369/44.41 |

(List continued on next page.)

FOREIGN PATENT DOCUMENTS

| | | |
|---|---|---|
| A831264 | 11/1975 | Belgium . |
| 831264 | 11/1975 | Belgium . |
| 092420 | of 0000 | European Pat. Off. . |
| 569718 | 11/1993 | European Pat. Off. . |
| 2120001 | 4/1983 | United Kingdom . |

OTHER PUBLICATIONS

Patent Abstracts Of Japan, vol. 12, No. 138 (P–695) 27 Apr. 1988 & JP–A–62 259 239 (Hitachi) 11 Nov. 1987—abstract.
Patent Abstracts Of Japan, vol. 9, No. 24 (P–331 31 Jan. 1985 & JP–A–59 168 942 (Matsushita Denki Sangyo K K) 22 Sept. 1984—abstract.
Patent Abstracts Of Japan, vol. 9, No. 86 (P–349) 16 Apr. 1985 & JP–A–59 215 033 (Hitachi Seisakusho K K) 4 Dec. 1984—abstract.
Patent Abstracts Of Japan, vol. 14, No. 8 (P–987) 10 Jan. 1990 & JP–A–01 258 228 (Sony Corp) 16 Oct. 1989.
D. F. Barbe, "Time delay and integration image sensors", Solid State Imaging, P. G. Jespers et al, Nordhoff, The Netherlands, pp. 659–671 (1976).
"Offnet 1:1 system: some further uses", M. V. .R. K. Murtz, Optical Engineering, vol. 24, No. 2, pp. 326–328 (Apr., 1985).

*Primary Examiner*—Georgia Y. Epps
*Assistant Examiner*—Kim-Kwok Chu
*Attorney, Agent, or Firm*—Lerner, David, Littenberg, Krumholz & Mentlik

[57] ABSTRACT

A method of reading data from an optical disk comprises providing means for illuminating the required part of the disk and acquiring the optical image of a plurality of tracks, providing a detector matrix comprising a plurality of detectors, each of the detectors being capable of producing an output signal which is proportional to the intensity of the light detected by it causing an optical image corresponding to an illuminated area to fall on the said detector matrix, transferring the output signal of the detector matrix to image processing means, determining position coordinates of the track center for each data track, by analyzing the output signal of the said detector matrix, saving in memory means expected track center data, comprising position coordinates of the track center located by the analysis of the output signal, and if an actually detected track center is shifted with respect to the expected track center, electronically moving the track center position.

4 Claims, 12 Drawing Sheets

U.S. PATENT DOCUMENTS

| | | | |
|---|---|---|---|
| 5,081,617 | 1/1992 | Gelbart | 369/112 |
| 5,111,445 | 5/1992 | Psaltis et al. | 369/103 |
| 5,128,919 | 7/1992 | Narahara et al. | 369/124 |
| 5,150,347 | 9/1992 | Yanagi | 369/44.37 |
| 5,181,161 | 1/1993 | Hirose et al. | 369/48 |
| 5,231,627 | 7/1993 | Paul et al. | 369/125 |
| 5,233,583 | 8/1993 | Reno | 369/111 |
| 5,247,510 | 9/1993 | Lee et al. | 369/118 |
| 5,253,245 | 10/1993 | Rabedeau | 369/119 |
| 5,258,970 | 11/1993 | Kobayashi | 369/109 |
| 5,265,085 | 11/1993 | Jaquette et al. | 369/124 |
| 5,293,569 | 3/1994 | Koyama | 369/112 |
| 5,295,125 | 3/1994 | Oonishi | 369/44.29 |
| 5,313,441 | 5/1994 | Imai et al. | 369/112 |
| 5,365,535 | 11/1994 | Yamaguchi et al. | 369/121 |
| 5,394,385 | 2/1995 | Sakurada et al. | 369/44.23 |
| 5,420,840 | 5/1995 | Bec | 369/44.14 |
| 5,438,563 | 8/1995 | Oshiba et al. | 369/124 |

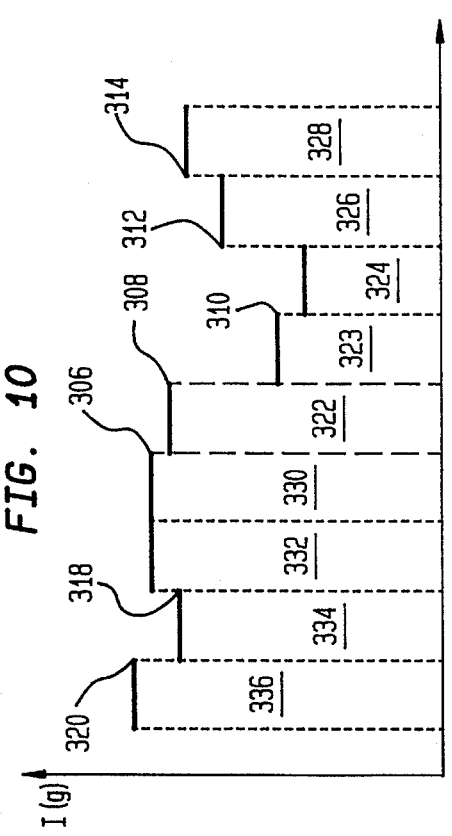
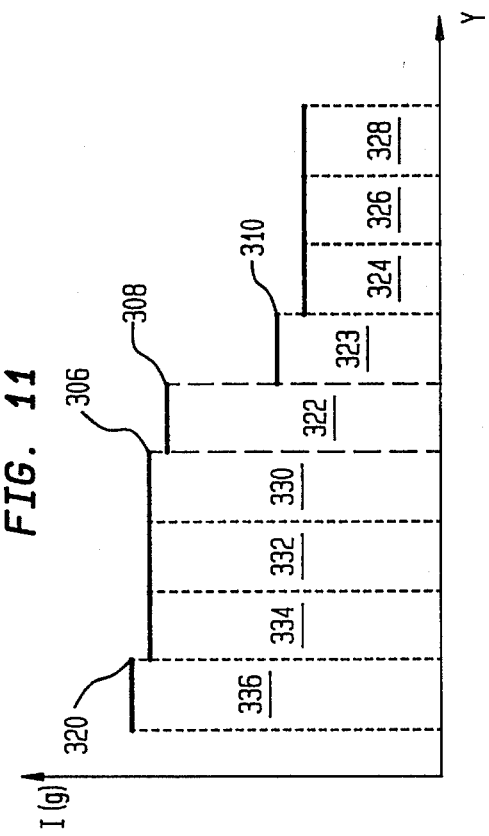

READING MULTIPLE TRACKS DATA WITH A MICROSCOPE SCANNER AND A TWO MIRROR LIGHT BEAM FOCUS UNIT

This is a division of application Ser. No. 08/043,254, filed on Apr. 6, 1993, now U.S. Pat. No. 5,426,623 issued on Jun. 20, 1995.

FIELD OF THE INVENTION

The present invention relates to optical disks. More particularly, the invention relates to a method and apparatus for reading large amounts of data at a high rate from optical disks.

BACKGROUND OF THE INVENTION

Optical disks are becoming the base for computerized archives and data bases because of their huge capacity. When they are organized in a jukebox which contains tens of disks and numerous disk drivers, they can form very large archives.

The main disadvantage of these disks and disk system is the serial mode in which the data is read from them. Coupled with slow access time this mode limits the search performance and the rate at which the data is transferred to the computing system. An optical disk contains an index of the data. By using the index, the access time to a piece of data is shorter than if the data has to be searched for serially. However, for the more demanding applications, where the same data is searched for in varying contexts or by varying criteria, the index is of no help and searching through all the disk is required. Such a search can take a very long time if done serially. Even worse, when the search is done on a jukebox which contains a few drivers and tens of disks to be searched, the search time becomes extremely long. The rate of transfer from the data to the disk to the system is much slower than the processing rate of a common CPU unit. Hence, much of the CPU time is wasted in waiting for data being fetched from the disk.

Optical disks of various kinds are based on concentric circular or spiral tracks on which the data is written in the form of spots of changes of some optical property of the disk media. These changes are typically spots of higher reflection than the non data-containing parts of the disk. These data spots lie along a spiral or circular path on the disk. The disk is divided into sectors, and each loop of this spiral path that lies within a sector is called a track. The data is read from the optical disk by an electro-optical head which projects a narrow light spot on the rotating disk, reads the reflected light from the disk and transduces it into an electrical signal. At any point in time the head reads one spot of data. By rotating the disk below the head, a track is read spot by spot. To read data from outer or inner tracks, the head is moved to the desired track by a motor. In advanced split head design the moving head is composed of a lens, a focusing coil motor, a fine tracking motor and mirrors. This combination of rotating disk with a radially moving head enables to access any data spot on the disk. The reading of the data spots is done serially along a track or along the whole spiral path. Commercially available optical disks have internal data transfer rates of about 15 Mbit/sec, which translates to an output rate of 1.25 Mbyte/sec. Searching through a whole disk may thus take more than ten minutes.

Optical heads can read several tracks simultaneously when combining a lens with a wide field of view and a matrix of light detectors that cover this field. Processing the signal from each of these detectors separately, in parallel, multiplies the data throughout proportionately to the number of detectors. Such a matrix of detectors is described, e.g., in U.S. Pat. No. 5,111,445. However, implementing parallel reading of an optical disk by a detector matrix requires first solving some severe problems.

The first problem is that of sampling the data spots that lie on a polar coordinate system by a matrix of detectors set in a rectangular coordinate system. As a result of such sampling, data spots may be sampled not in track order, which may result in the scrambling of the data structure.

Another problem is that unlike the electro-optical head according to the known art, which has a servo system to center the head over the track, centering a line-scan matrix over many curved tracks is very difficult. Without centering the detectors on the tracks, radial movement of the disk may shift the data spots between neighboring detectors and thus, again, scramble the data structure. All of this has to be done at the very fast speed of the data spots (i.e., 15 Mbit/sec.).

Yet another problem is that a detector matrix cannot economically cover all the tens of thousands of tracks, so that some means for fast moving to different group of tracks is needed. After each of such movement the detector matrix have to be aligned to the right tracks.

Generally speaking, reading data from an optical disk requires high precision. Ordinarily, such a reading is carried out using coherent light, even if writing of the data has been effected with non-coherent light, e.g., as in U.S. Pat. Nos. 3,805,275 or 4,135,251. In some instances non-coherent light has been used in illuminating data in the form of the amplitude-modulation of the relief heat of a pattern of surface relief variation, such as in the microfiche-like system described in U.S. Pat. No. 4,486,870. However, such systems cannot read multitrack information and require the use of precise and expensive servo mechanisms.

It is therefore clear that it would be highly desirable to be able to overcome the aforesaid problems and to provide reading means capable of transferring to the system data from an optical disk at a high rate.

It is an object of the present invention to provide such a method and apparatus which permit to read high amounts of data and to transfer data at high rate from the optical disk to the system.

It is another object of the invention to provide a system for reading data from an optical disk which does not require mechanical adjustment to compensate for small disk drift in the radial position, and to eliminate the fine tracking coil in the moving part.

It is a further object of the invention to provide a system for fast access to any data (track) on the disk or on multiple disks.

It is still another object of the invention to provide a device by means of which a plurality of disks can be read by a single head.

SUMMARY OF THE INVENTION

The present invention is directed to the use of a non-coherent optical system for carrying out fast data reading from an optical disk, without the use of a mechanical servo mechanism for small position corrections. While the invention comprises many different aspects, it should be understood that in each case the two aforementioned characteristics are maintained, vis., a non-coherent system is used and no mechanical servo mechanism is provided for correcting local drift. It should be understood that the ability of fast addressing the data on the optical disk, with high precision, is related to the fact that an electronic servo mechanism is employed, and is made possible by the use of a non-coherent system in a manner never devised before in the art.

The reading device for an optical data disk, according to the present invention, comprises an optical apparatus for fast addressing tracks on the disk, optical apparatus for imaging the tracks on detector matrix comprising a plurality of detectors arranged in parallel lines, the said detector matrix being coupled to a plurality of shift registers, whereby electric charge generated by light falling on each cell is transferred to the following cell and the shift register receives the combined charge from the last cell in the line. One such device is the so-called TDI sensor, described, e.g., in D. F. Barbe, "Time delay and integration image sensors", *Solid State Imaging*, P. G. Jespers et al, Nordhoff, The Netherlands, pp. 659–671 (1976).

The device according to the invention further comprises image processing means to receive the image generated by the detector matrix and to translate said image into data contained in data spots located on the disk.

The invention is further directed to a method of accessing and reading data from an optical disk, which method comprises the steps of:

1) providing means for illuminating the required part of the disk and acquiring the optical image of a plurality of tracks;

2) providing a detector matrix comprising a plurality of detectors, each of the said detectors being capable of producing an output signal which is proportional to the intensity of the light detected by it;

3) causing an optical image corresponding to an illuminated area to fall on the said detector matrix;

4) transferring the output signal of the said detector matrix to image processing means;

5) determining position coordinates of the track center for each data track, by analyzing the output signal of the said detector matrix;

6) saving in memory means expected track center data, comprising position coordinates of the track center located by the said analysis of the output signal; and 7) if an actually detected track center is shifted with respect to the said expected track center, elastomerically moving the track center position.

According to one embodiment of the invention, at the beginning of the operation a so-called "locking" operation is carried out, to determine the track center, and the coordinates of the track center initially found are used as the first value for the expected track center. Additionally, in another preferred embodiment of the invention a number of track center values consecutively determined are considered, to permit statistical evaluation of drift and other system parameters.

As will be apparent to a person skilled in the art, the ability to move to the centers of the data tracks electronically, by redefining the position of said tracks without the need for mechanical adjustment, enables the compensation for small drift in the disk movement. This compensation is critical for reading many tracks simultaneously. This ability to compensate quickly for such drift is one important feature of the invention, which permits to process large amounts of data at high rates.

As will be appreciated by the skilled person, coherent systems require that the phase of the electromagnetic wave be taken into account, while non-coherent systems only accumulate the level of the signal generated by the light they detect. It has been found, and this is an aspect of the invention, that the use of non-coherent systems permits to avoid many drawbacks found in prior art systems utilizing coherent light and imaging systems. For instance, edges are sharp in coherent systems and lead to overshoot and undershoot effects in the detected signal, which do not exist in non-coherent systems. Furthermore, because coherent systems are phase-dependent, every factor which influences the phase, such as changes in height or slope of the optical surface, affect the data read from the disk. Thus, for instances, prior art parallel read systems are very sensitive to dust and dirt. The system of the invention, on the other hand, is much less sensitive to irregularities of the optical medium and is therefore much less disturbed by dust and dirt. Thus, in another aspect, the invention is directed to a method which permits to reduce the adverse effect of irregularities on the surface of the optical media and thus to increase the accuracy of readings therefrom.

As will further be apparent, the ability to scan the disk without moving the optical head, but only lightweight optics, is also another important feature. Another important feature is the ability to access data tracks electronically, within close proximity. Still another advantage of the invention relates to the easy access to a plurality of disks.

All the above and other characteristics and advantages of the invention will be better understood through the following illustrative and non-limitative description of preferred embodiments thereof.

BRIEF DESCRIPTION OF THE DRAWINGS

FIGS. 10 and 11 give the respective input and output to the PPD algorithm and exemplify its operation.

DETAILED DESCRIPTION OF THE INVENTION

Figure 1:
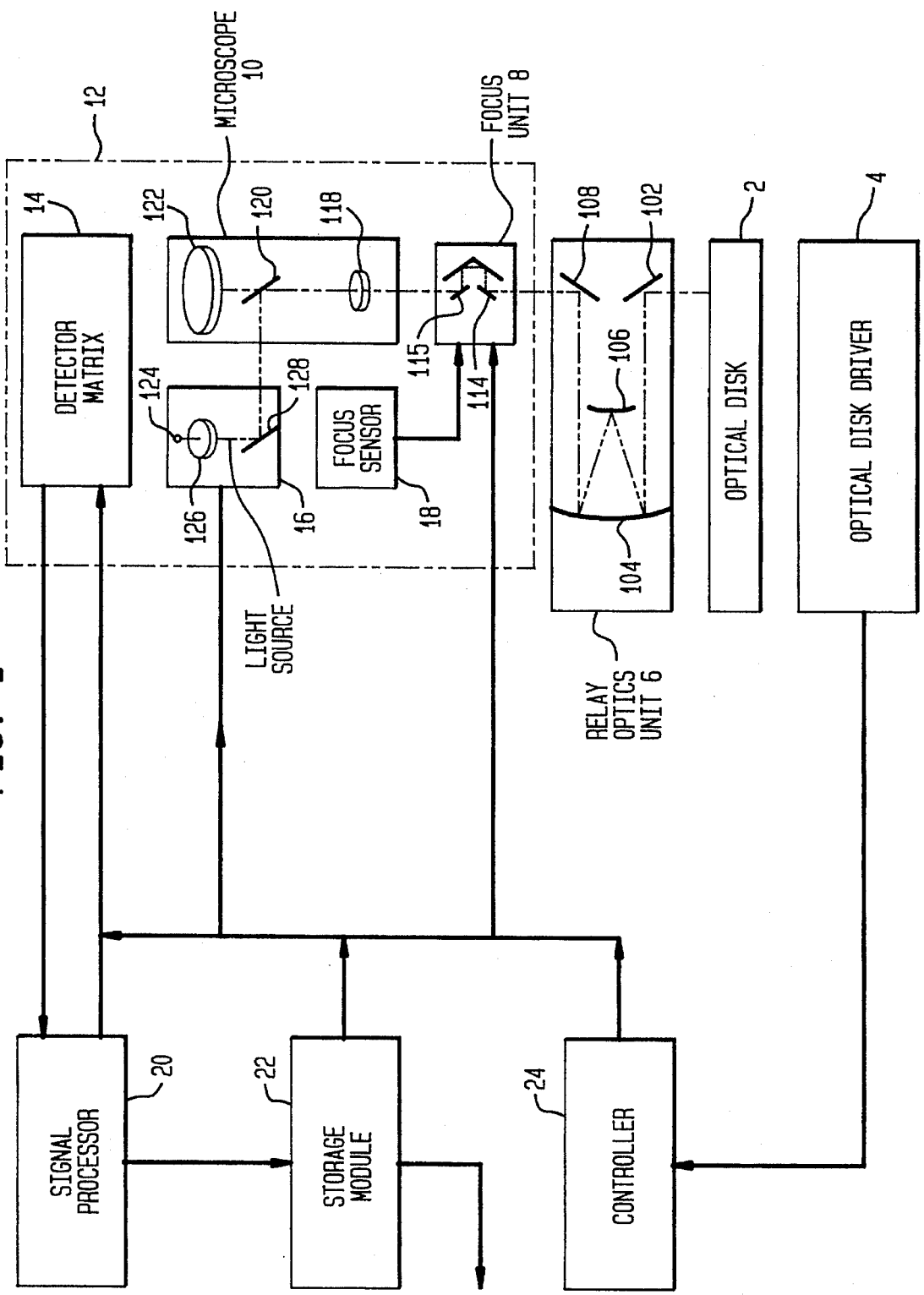
FIG. 1 schematically shows the main modules of the preferred embodiment of the invention.

In FIG. 1, the preferred embodiment of the system for disk searching and reading is described. An optical disk 2 to be scanned by the system is placed in optical disk driver 4 which rotates the disk. Above disk 2 there is relay optics unit 6 that images the disk to intermediate image above it. The relay optics has a long optical path which creates enough space for optical elements such as the step and focus unit 8 or folding mirrors for multi disk configuration. The data is acquired by one or more reading heads 12, each one comprises of microscope 10, light source 16, detector matrix 14, focus sensor 18, and step and focus unit 8. These units are to be described below. The disk is illuminated by a light beam that is emitted from light unit 16, focused by microscope 10 and relayed by relay optics 6 to generate a uniform area of non-coherent illumination on disk 2. The light unit 16 is composed of a laser diode or a laser diode array, a fiber optics (both not shown), and a projection lens which projects the light onto the back focal plane of the objective lens such that the full aperture of the objective is illuminated. Thus the disk is illuminated with the full numerical aperture of the objective. This provides for a non-coherent system. This system is particularly convenient, as will be apparent to the skilled person, when used in conjunction with a TDI. The light reflected from the disk is relayed by relay optics 6 to form intermediate image of the disk inside the step and focus unit 8. This image is re-imaged by microscope 10 on detector matrix 14. The step and focus unit 8 step through intermediate image such that the required tracks of disk 2 are imaged by microscope 10 on detector matrix 14. The only moving parts are light weight mirrors 114 and 115 in the step and focus unit 8 which can be moved very fast, while all other optical and electrical components are fixed. The electrical signal that is generated by detector matrix 14 is processed by signal processing module 20. This module detects the presence and location of the sets of data spots in an optical storge medium. Data spots information is sent to storage module 22 and after structuring, the data is sent to a computer system (not shown). The data spot location signal is sent to controller 24. The controller sums up the changes in data spot location on the tracks and sends correction signals to signal processor 20 and to step and focus unit 8. Controller 24 sends also synchronization signals to detector matrix 14, to signal processor 20, and to storage module 22.

Auto focus sensor 18 senses the focusing state of microscope 10 and send correcting signals to step and focus module 8.

Referring to FIG. 1, a more detailed description of optical modules is brought. The preferred embodiment of the relay optics is of two spherical mirrors arranged in Offner telecentric type ["Offner 1:1 system: some further uses", M. V. R. K. Murtz, *Optical Engineering*, Vol. 24, No. 2, pp. 326–328 (April, 1985), Offener, U.S. Pat. No. 3,748,015]. The light from the disk is folded by mirror 102 toward spherical mirror 104. The light is reflected from mirror 104 toward the second spherical mirror 106 that reflects the light back to mirror 104. The reflected light from mirror 104 is folded by mirror 108 toward step and focus unit 8. This relay optics images the whole cross-section of the disk by 1× magnification. The illuminated area is imaged on an annular ring field as described in U.S. Pat. No. 3,748,015. The step and focus (to be described below) folds the light toward the microscope 10. Microscope 10 consists of objective lens 118, beam splitter 120, and tube lens 122. In the preferred embodiment the objective lens is, for example, of ×25 magnification (together with the tube lens) and the beam splitter is of 50:50 ratio. By replacing the 50:50 beam splitter 120 with a polarizing beam splitter and inserting a λ/4 plate between the beam splitter and the objective lens, and by replacing mirror 128 with a polarizing mirror, the system becomes sensitive to polarization, which is an important factor for some types of optical disks.

Figure 2:
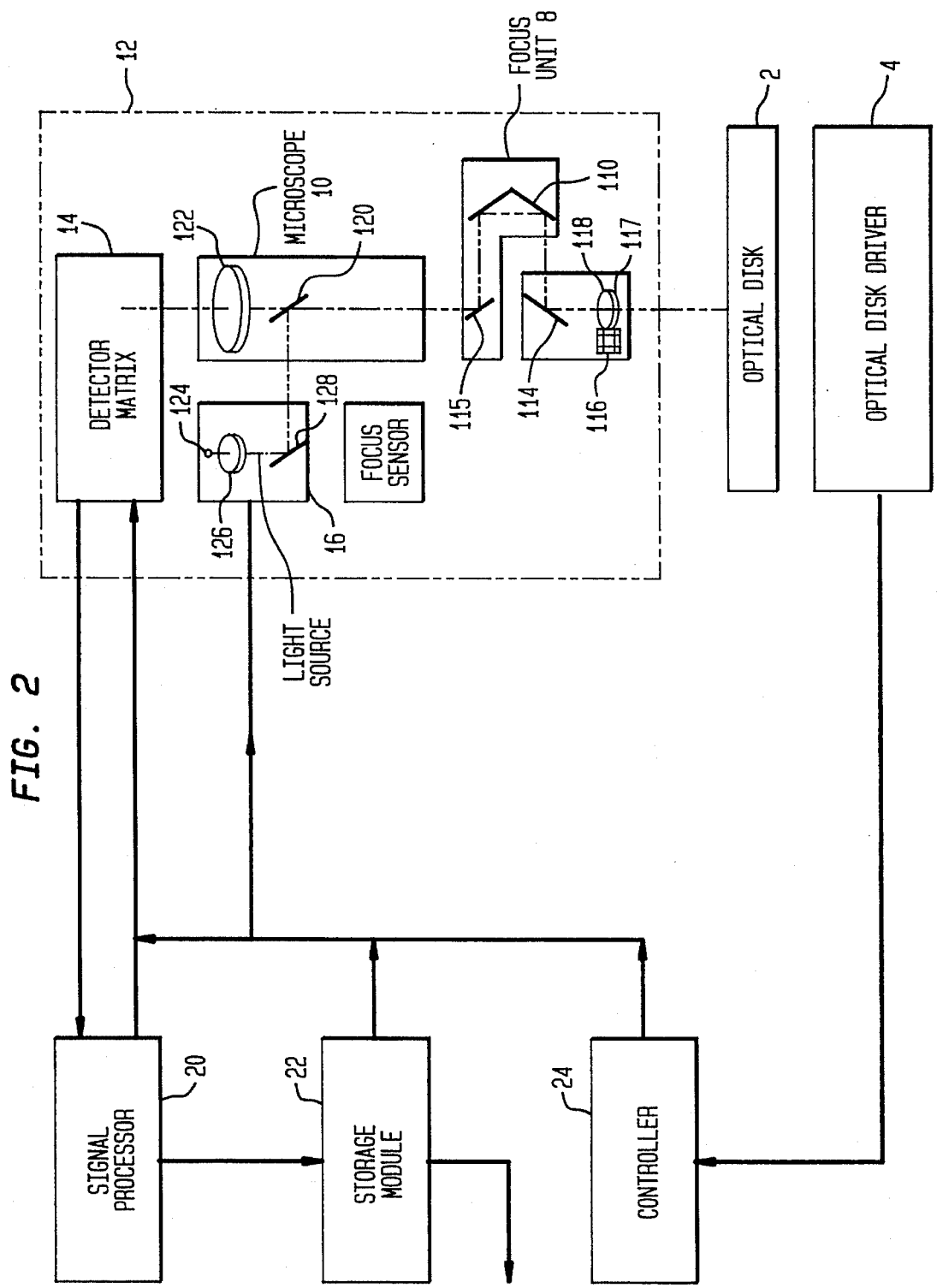
FIG. 2 schematically shows the main modules of another embodiment of the invention.

The light from light source 124 is focused by lens 126 in the back focal plane of objective lens 118, to form a Kohler illuminating system. Mirror 128 folds the light toward beam splitter 120 so that it folds it toward objective lens 118. The light is folded by mirrors 110, 114, 115 in the step and focus unit 8 and relayed by relay optics 6 toward disk 2 in order to generate uniform areas of light on it. In FIG. 2, another embodiment of the invention is described. In this embodiment, which will be referred to as a "light split head", for the sake of brevity, the relay optics is left out and the objective lens 118 is set directly above the optical disk. The focusing of the microscope is done by voice coil 116, which moves objective lens 118 towards the disk according to the focusing signal from focusing sensor 18. The objective lens 118, its voice coil 116 and mirror 114 are moved directly by a motor to image the required tracks of the disk by microscope 10. The step and focus unit 8 is used to compensate for the varying distances of the moving parts 117 from the static parts of the reading head. This embodiment is simpler but still faster than a conventional split head, since the fine tracking coil is eliminated due to the use of electronic tracking, thereby significantly reducing the weight of the moving parts. In this configuration a plurality of disks can also be provided, each having its own drive or mounted on a single spindle where each disk has its own moving part 117, and a step and focus unit 8 is used to compensate for the varying distances of the disks from the single reading head.

Figure 3:
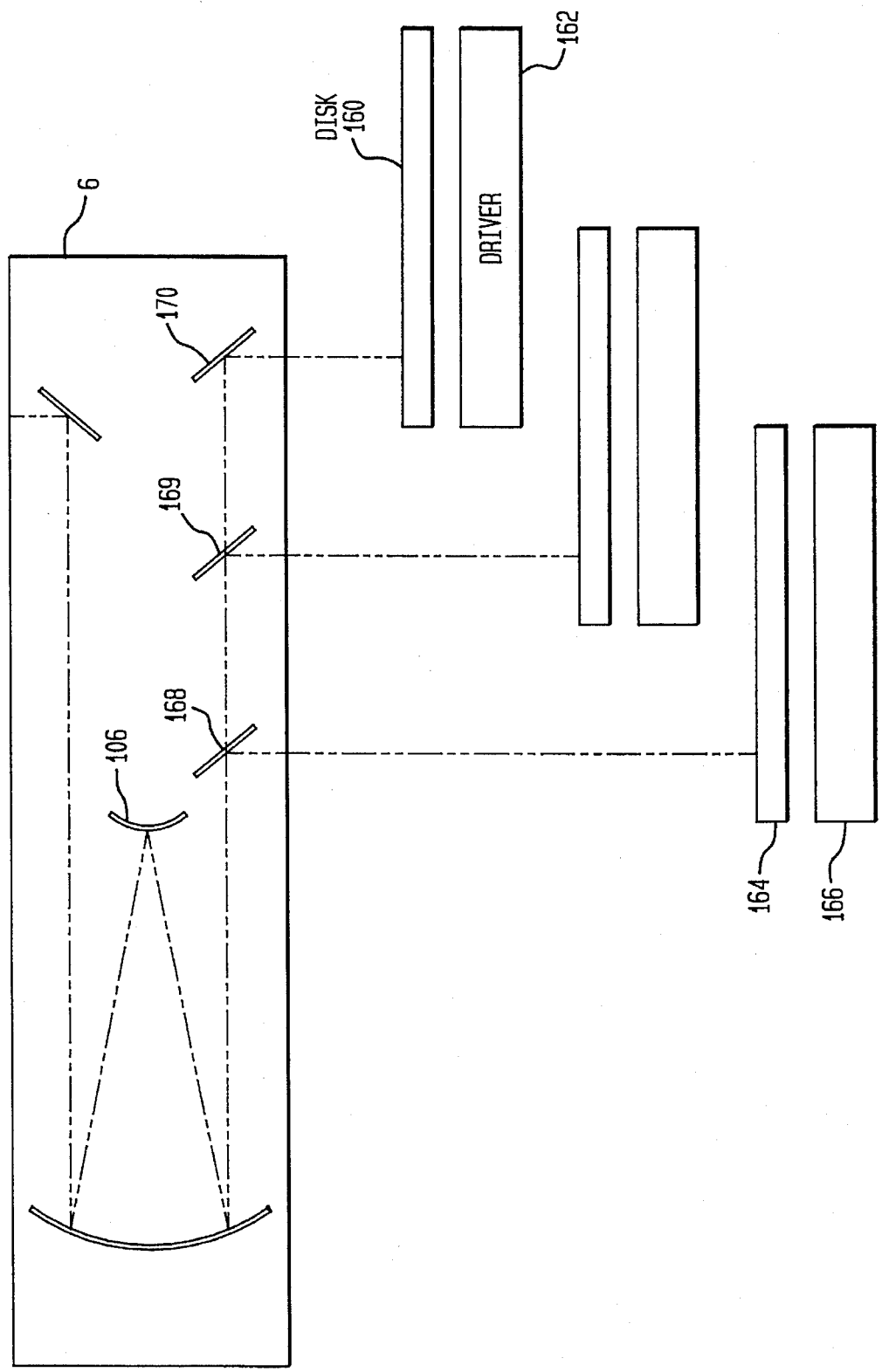
FIG. 3 illustrates a multi-driver configuration of the system, according to a preferred embodiment of the invention.

In FIG. 3, another embodiment of a system that enables the multi-disk configuration is illustrated. In relay optics unit 6 there are several folding mirrors (168,169,170). Each of the mirrors can be rotated by a motor (not shown) such that it is in folding position (i.e. fold the beam) or in unfolding position (i.e. outside the beam). The first mirror, 168, folds the beam toward disk 164 laying on driver 166 that has the longest distance from mirror 168. The last mirror, 170, folds the beam toward the last disk, 160, laying over driver 162 that has the shortest distance from mirror 170. Between folding mirrors 168 and 170 there are several such mirrors 169 so it can be set so each of them folds the beam toward a disk and drivers laying between drivers 166 and 162. The driver and disk are positioned such that the optical path between mirror 106 and the disks is equal for all the disks in the system. This configuration enables fast switching between multiple disks.

Figure 4:
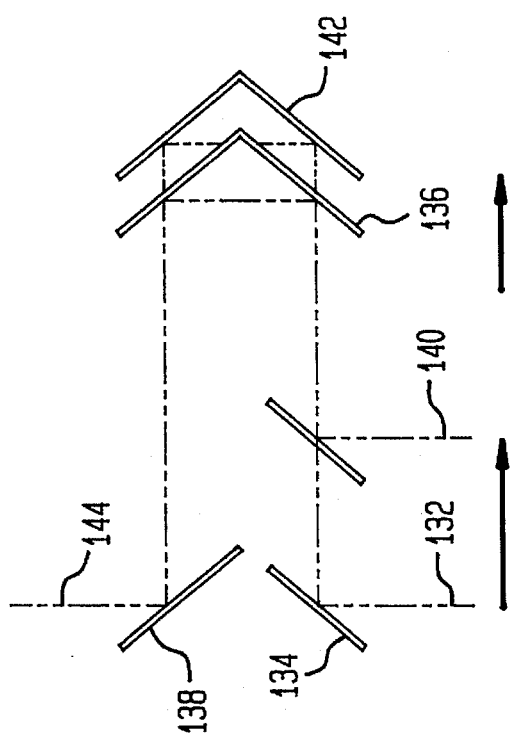
FIG. 4 illustrates the scanning operation of the step and focus unit.

Referring now to FIG. 4, the stepping operation of step and focus unit 8 is described. Light ray 132 from a track on disk 2 is folded by mirrors 134, 136 and 138 such that it exits at line 144 on the optical axis to the microscope. In order for the microscope to see light rays from another distance (i.e. out of the field of view of the microscope), mirror 134 moves the required distances to position 140. This movement changes the optical path length of the beam folded by mirror 136 toward line 144. Therefore, mirror 136 is moved half the movement of mirror 134 to position 142. In that position the optical path length of ray 140 to line 144 is equal to path length of ray 132 to line 144 so the microscope "sees" the same distance. Mirrors 136 and 134 are moved by a motor that is controlled by system controller 24. By moving only lightweight mirrors a very fast scanning is made possible.

Figure 5:
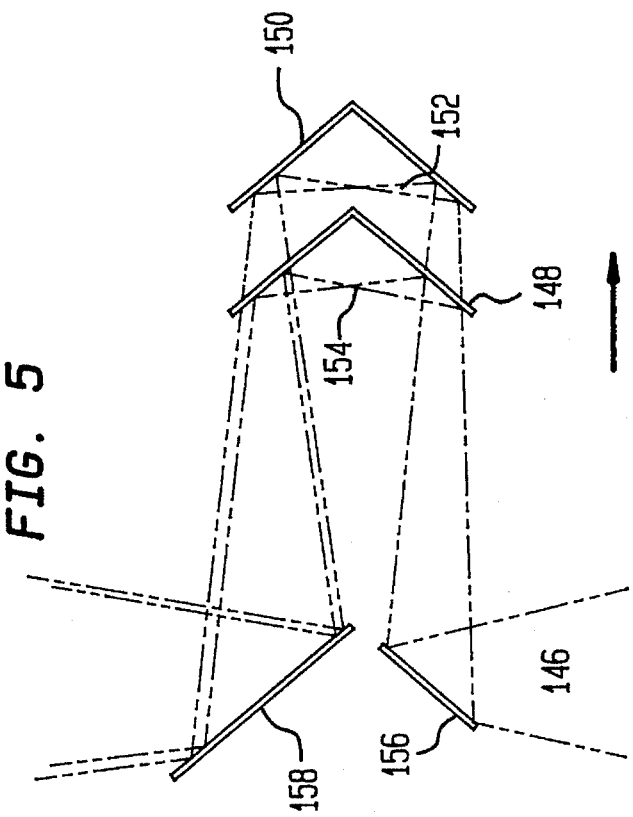
FIG. 5 illustrates the focusing operation of the step and focus unit.

Referring now to FIG. 5, the focusing operation of step and focus unit 8 is described. Light beam 146 from disk 2 is folded by mirror 156 and focused in position 154. This focused beam is folded by mirrors 148 and 158 toward the microscope. If position 158 is out of focus for the microscope, mirror 148 is moved to position 150 so that beam 146 is focused at point 152 which is the focus position for the microscope. Mirror 148 is moved by a motor that is controlled by the focusing sensor (18 in FIG. 1) of the reading head.

The structure of the detector matrix 14, the organization of the signal processing unit 20, the storage module 22 and the controller unit 24 are designed to solve the problems described above in parallel reading of data in an optical disk by a rectangular matrix of detectors. Also, they are designed to detect and register the data spots on their data track at the fast rate at which the data spots are passing by the detectors. The detector matrix is of the CCD type, and is organized in a TDI (Time Delay and Integration) structure.

Figure 6:
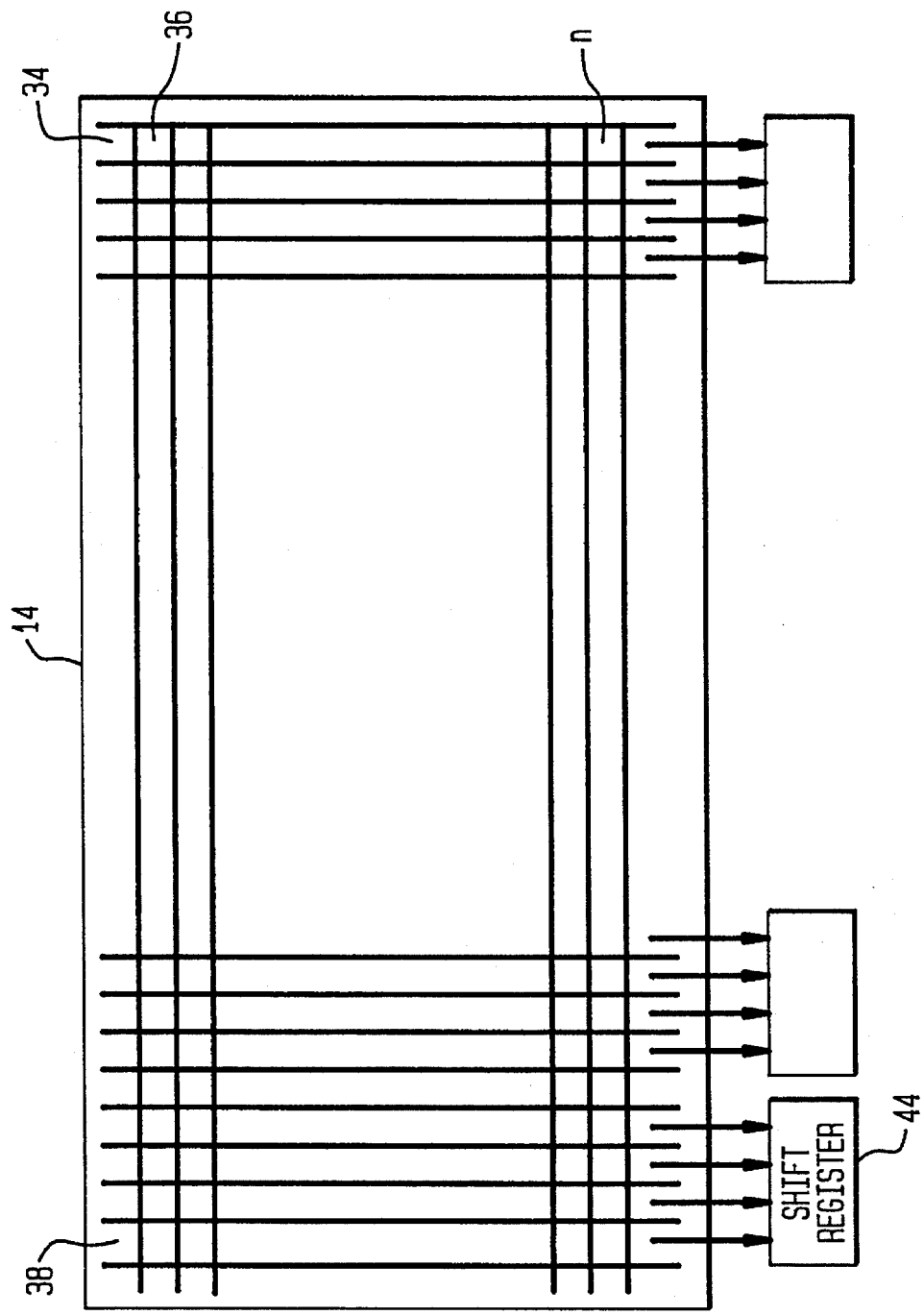
FIG. 6 illustrates a conventional TDI detector matrix.

Referring now to FIG. 6, the TDI detector matrix is described. The TDI detector matrix 14 includes a plurality of parallel lines 34 through n, each of which contains a large number of detectors. The electrical charge generated by the light falling on each detector in the lines 34 can be transferred to the neighboring detector of the adjacent line of detectors, and be summed with the charge of the neighboring detector 36. The transfer of charge from one line of detectors is synchronized with the movement of the data spot along the detectors columns 38. The speed of transfer of the charges is therefore equal to the tangaitial velocity of the disk. The charges generated by a moving data spot on the detectors that lie on one of the columns 38 are summed by this transfer to give a stronger signal at the last line, n. The charge from the last row n is transferred to a readout shift registers 44. Each shift register 44 is connected to a segment of the last row of detectors, n, and the charge from the detectors of the segment is transferred thereto. The charge from each cell of the shift register is read out serially. The readout data rate from the shift registers 44 limits the transfer rate of charges from row to row. Therefore, the number of detectors connected to each shift register should fit the required readout rate and the detector transfer rate. For example, for a disk with a data rate of 15 Mspot/sec. and a CCD detector with an output transfer rate of 60 Mhz, each shift register is connected to four detectors.

Figure 7:
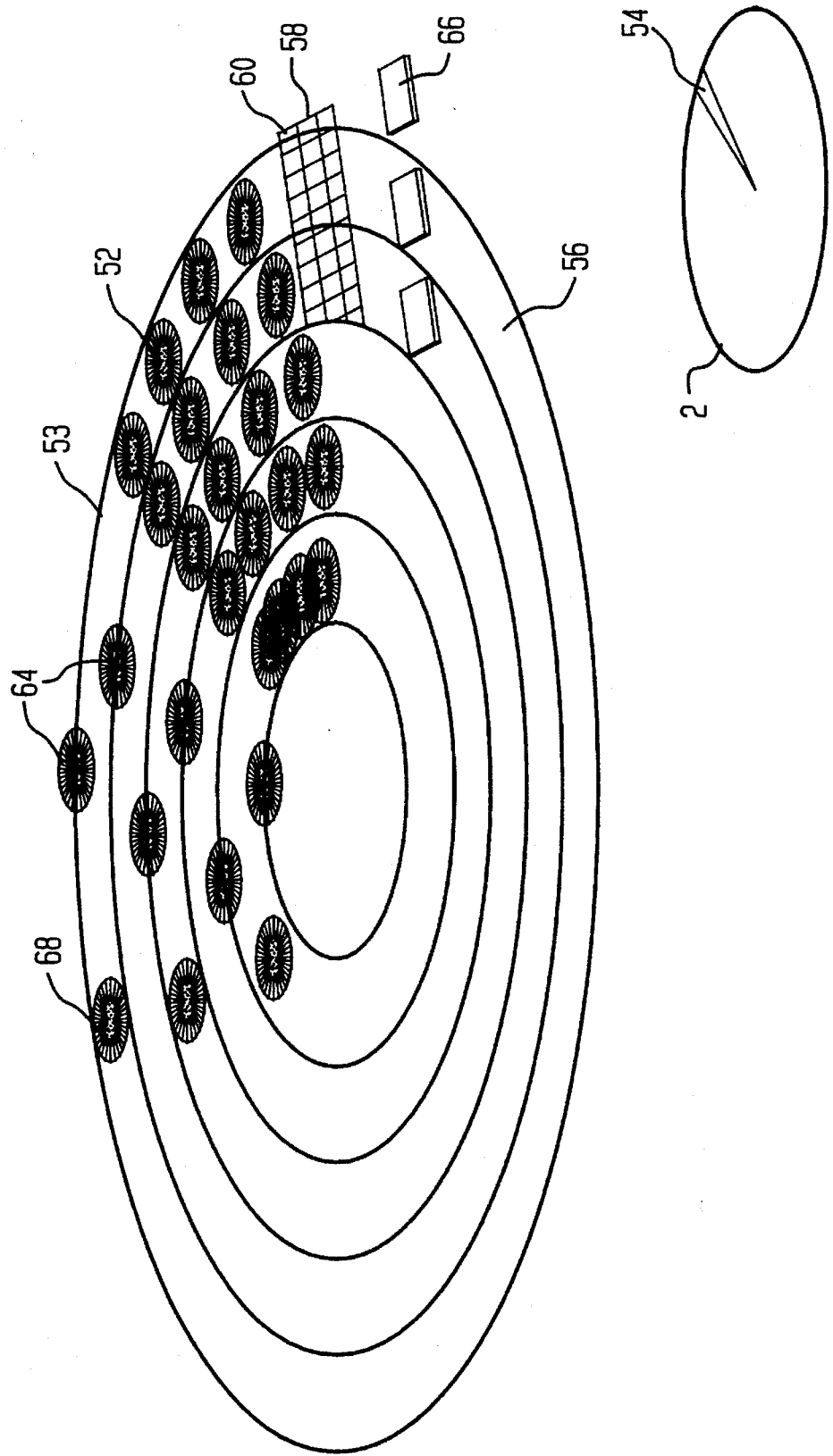
FIG. 7 illustrates the reading of a number of tracks with a conventional TDI detector matrix.

FIG. 7 illustrates the relation between the illuminated area on the disk and the image on the detector matrix 14. The magnified image 53 of the illuminated area 54 on the disk 2 lies over the detectors 58 of the detector matrix 14 so that the images of the data spots 52 on tracks 56 of the rotating disk 2 are crossing the last row of detectors perpendicularly. Due to diffraction, the diameter of the image spot is approximately equal to the width of the track.

At any moment in time, each image of data spot 52 lies over a square that contains nXm detectors. This nXm sampling of a data spot enables to localize a data spot on the right track when the disk has a small radial movement. It also enables to detect the presence of two succeeding data spots that are barely resolved, in inner tracks of the disk. The number of detectors along a column 60 is limited by the curvature of the tracks 56 on the disk. The shift in the horizontal position of a track between the first row and the last row is less than a tenth of the size of a detector, for an inner track (at a radius of 3 cm). The difference between the tangential velocity of a data spot on the first and the last row is negligible.

Because of the radial movement of the disk, the tracks can be shifted with large amplitude. In order not to loose the shifted tracks, the rows of detectors have to be long enough to "see" the shifted tracks as well. For global shift of amplitude w and for track width d, additional 2·w/(d/m) detectors should be provided in the detector matrix 14. Alternatively, only small and fast shifts are compensated for electronically, and large slow shifts are mechanically compensated.

When the transfer rate of rows is about 15 Mrows/sec., and the required data rate is then 320 Mbit/sec. Hence, 320/(15/3)=64 spots must be read in parallel. A track is sampled by 3 pixels. Therefore, the number of detectors in each row should be at least 64×3=192. For a shift of tracks of global amplitude, ±30 µm, and for a track width of 1.5 µm, there should be 120 additional detectors in a row. Thus, the total number of detectors will be 312. If each three detectors are connected to a shift register, the number of shift registers required will be at least 78.

Figure 8:
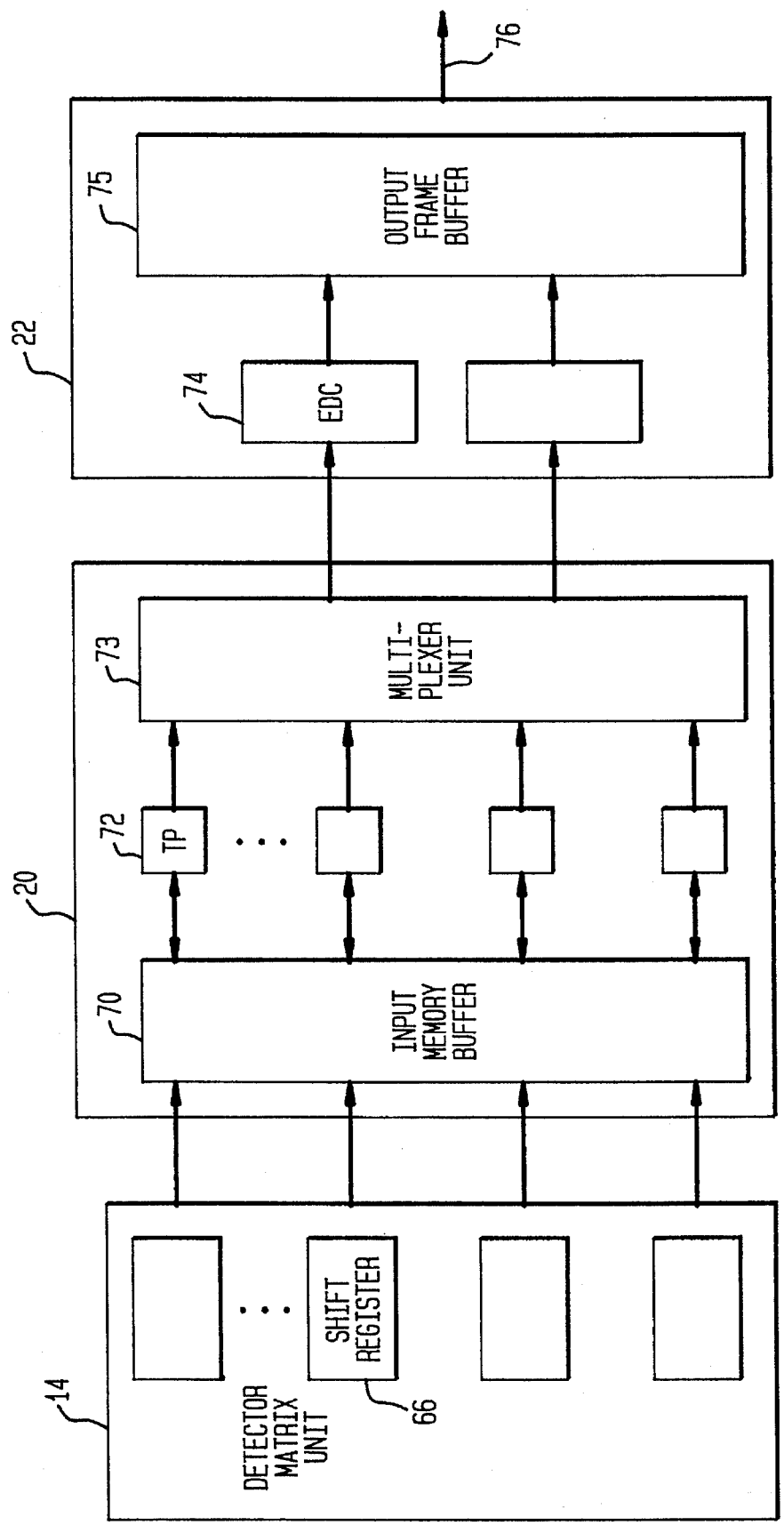
FIG. 8 is a schematic representation of a signal processing unit according to one embodiment of the invention.

FIG. 8 schematically illustrates image processing module 20. The module receives signals from detector matrix unit 14. The data from each shift register 66 of detector matrix 14 is fed to input memory buffers 70. Input memory buffers 70 are connected to a set of track processors (TP) 72 that detect the presence of image spots. The input memory buffer can also serve as a multiplexing unit transferring only a section of the detector outputs into the processors. By switching electronically between different sections of the matrix, a fast access to neighboring tracks is available. By processing spots, the processing rate is reduced by the number of detectors "covered" by a spot. Track detectors 72 align the spots on their right tracks. This alignment is done locally for small radial movement of the disk. More global alignment is done by system controller 24.

The TPs are connected via a multiplexer unit 73 (FIG. 8) to a set of error detection and correction (EDC) units 74. The EDC units are designed to extract and correct the data and store the segment data until it is ready for output. The output data is stored segment by segment in output frame buffer 75, where they are grouped to 8 bit byte.

Referring again to FIG. 8, the data rates and unit configurations according to a preferred embodiment of the invention are now explained. Referring to a system designed for a throughput of 20 Mbyte/sec. at output buffer 75, the EDC units 74 need to work at the rate of about 320 Mbit/sec. if a factor of at least 2 in detection/correction and header data, and 8 bits per byte are assumed. This requires about nine such units if each unit can process data at 20 Mhz. In turn, TP units 72 now need to process about 9 pixels for each output bit. This means that the system effective rate in pixel processing is 2880 Mpixels/sec. Such a rate is possible if 64 such units are used. The units are timed so that the interaction between TP 72, EDC 74 and the output buffer is synchronized.

The operation of track processor 72 is now described with reference to FIGS. 7 and 8. In FIG. 7, for example, the structure of tracks and sectors of the disks are illustrated. Before each sector 53, there is a sector header consisting of tracking spots 64 (usually 2 spots) laying on the edges of the tracks, and timing spots 61 (1 or 2) lay at the center of the tracks. These sector headers are pre-written accurately on the disk. Referring back to FIG. 8, the way that TP 72 uses this structure of the disk is described. Track processor 72 works in three modes: 1) detecting; 2) tracking and 3) locking.

In the detection mode, a spot 52 or a string of spots are identified by means of edge detection. In the preferred embodiment of the invention, the operator used for the edge detection is the difference of two Gaussians (DOG), which approximates very closely the second derivatives of a Gaussian distribution function, $G''(x)$:

$$G''(x) = \left(1 - \frac{x^2}{2\sigma^2}\right) \cdot e^{-(x^2/2\sigma^2)}$$

Figure 9:
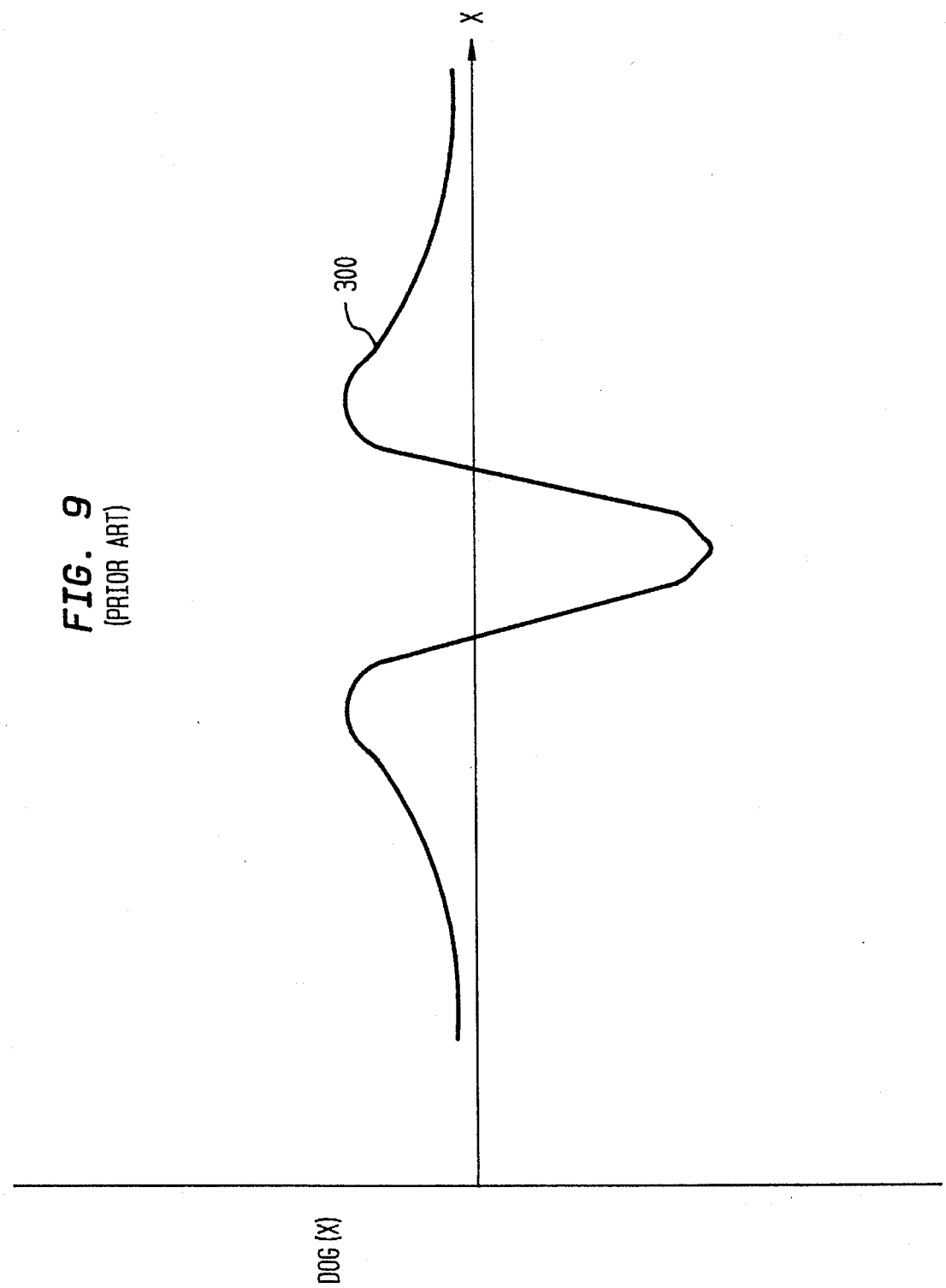
FIG. 9 illustrates the known DOG edge detection operator.

Referring now to FIG. 9, the DOG operate 300 is shown. The Gaussian component of the said operator removes some of the high frequency noise from the image, without diminishing the accuracy of the edge detector. The edge detection method is used in the context of the invention, and as such also forms a part of the invention.

The said operator is applied to the image via a convolution operation:

P(x)=I(x)G''(x)

where I(x) is the image function and P(x) is the resulting convolved image.

The DOG operator 300 is one-dimensional, and in the preferred embodiment of the invention its size is of odd number, is referred to as the "kernel", and is comprised of center and the right and left shoulders. The DOG operator 300 is applied to the data along the track. The convolution operation yields a convolved image comprising an array of positive, negative and zero values. The edges position is represented by the zero-crossing between adjacent positive and negative values. The location of the zero-crossing is calculated in sub-pixel accuracy, using interpolation.

The accuracy of the edge detector is very high as long as only one edge is located within the scope of the said operator. The said operator is designed to compute the location of the edge which is currently nearset to the said operator's center, which is the edge of interest. If other edges reside within the scope of the said operator, they bias the calculations designated to determine the position of the edge of interest. A special algorithm is applied to the raw data to dramatically reduce the influence of non-relevant edges residing within the scope of the DOG operator. This algorithm, the Pre-Processor for the DOG (PPD) operator 300, processes the raw data before the said operator is applied to it.

In a preferred embodiment of the invention, the PPD identifies the change in intensity, above a given threshold, which is nearest to the center of the kernel, and assumes it represents the edge of interest. The direction of the intensity of the edge of interest is then determined. All other changes in intensity (if such exist), above another given threshold, and in opposite direction to the edge of interest, are taken to be irrelevant edges.

The algorithm inspects each shoulder sequentially, from the center out. Pixels that form an edge with the preceding pixel, and the direction of the edge intensity is opposite to the direction of the intensity of the edge of interest, are set to the value of the preceding pixel. If the direction of the intensity is the same as that of the edge of interest, no action is taken. If no irrelevant edges are detected, no action is taken.

The following example illustrates the actions taken by the PPD. Referring to FIG. 10, the center of the kernel is placed over pixel 322 and is left of the edge 308, which position is to be calculated. The kernel in this example is nine pixels wide.

The PPD is searching the data on the right hand side of the kernel, sequentially. Edge 310, having an intensity gradient in the same direction as that of edge 308, is left as is. Edge 312, having an intensity gradient in the opposite direction than that of edge 308, is eliminated by setting pixel 326 to the value of pixel 324. The same goes for pixel 328, which is also set to the value of pixel 324, eliminating edge 314. Looking now on the left side of the kernel, edge 306 is left as is, having an intensity gradient in the same direction as that of edge 308. Edge 318, having an intensity gradient in the opposite direction than that of edge 308, is eliminated by setting the value of pixel 334 to the value of pixel 332. Edge 320 is left as is, since it is in the same direction of edge 308, and the value of pixel 336 is higher than that of the new value of pixel 334 (=value of pixel 332). Referring to FIG. 11, the "cleaner" data segment, as submitted to the convolution operator, is illustrated. The values of pixels 326 and 328 are now leveled with the value of pixel 324. Pixel 334 has now the same value as pixel 332. Edges 312, 314 and 318 have been eliminated.

Another embodiment of the PPD method includes a varying size kernel where a short kernel is executed at highly dense areas and a long kernel is executed at sparse areas.

Once the edges have been calculated, the distance between adjacent edges is computed and translated into "spot" units. This translation is dependent on the overlap ratio between spots and the radial distance of the given track from the rotational axis of the disk.

Referring back to FIG. 8, the modes of the TP 72 are described. In the locking mode, the initial location of the center of the track is computed and set. TP 72 calculates the half-width distance between two of the nearest successive tracking spots 64 (in FIG. 7) of the sector header, and confirms this with the timing spot(s) 68 on the track center.

In the preferred embodiment of the invention, the sampling resolution is three pixels across each track. In the tracking mode, the maximum (or minimum) value across the track (over 4 pixels) is computed in sub-pixel resolution. The location of the maximum is recorded. This process is referred to as the "peak detection". Any shift in the position of the maximum, relative to the current track center, is detected. The new track center is computed and the corresponding pixel nearest the center of the track is tagged as the central pixel of the track. For non-sampled tracks, where the tracking points do not exist, the locking is performed on the track data.

In the detection mode, the edges of a spot or a string of spots are detected, along the track direction. The distance between adjacent edges is computed at the center of the track. The above distance is translated into "spot" units, taking into account the overlap between the spots and the radial distance of the given track from the rotational axis. In the same manner, the distance between adjacent strings of spots is computed. The length of the strings and the gaps between them are then used by the decoding schemes.

The mechanism for detecting the peaks is further described below.

The peak detection mechanism is quite similar to the edge detection mechanism, "peak location" meaning the location along a row of pixels across a track and between two track edges, where the maximum (or minimum) intensity value is located.

Figure 12:
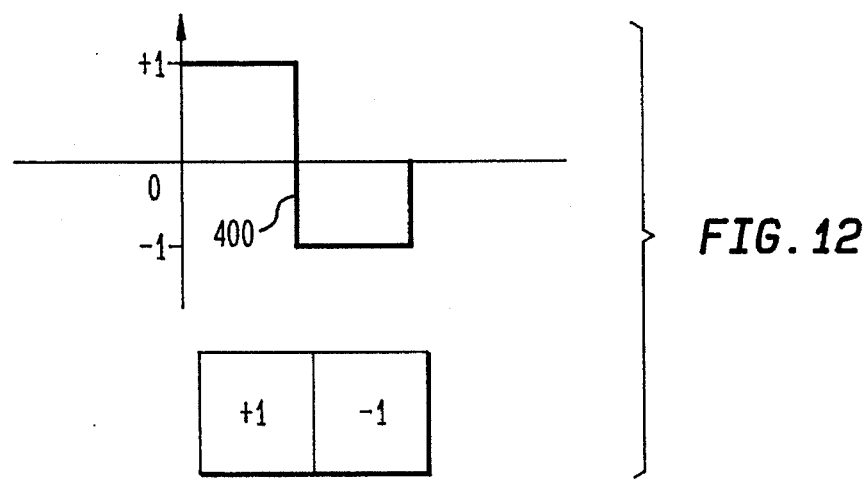
FIG. 12 illustrates the peak detection operator.

Referring to FIG. 12, in the preferred embodiment of the invention, the operator used for the peak detection is the First Difference operator 400, which is a one-dimensional operator consisting of two values: +1 and =1. Convolving the operator with pixels across the track direction, yields a convolved image comprising an array of positive, negative and zero values. The zero-crossing between adjacent positive and negative values represent points of maxima and minima of the intensity levels. The gradient direction of the zero-crossing determines whether it is a minimum or a maximum. The exact position of each zero crossing is again computed in a sub-pixel accuracy, using interpolation. To reduce high-frequency noise it is possible to convolve the image with a one-dimensional Gaussian mask, across the tracks, before applying the First Difference operator.

Applying the first difference operator across track direction directly on the input signals has the disadvantage that neighboring pixels must be well calibrated. In order to alleviate this problem it is possible to apply first the difference operator in the track direction, whereby each pixel is subtracted from the same pixel in the detection matrix (but at a different time), and then to search for the maximum (or minimum) value between the gradients in the cross track direction.

The following examples will further illustrate the invention, but are not intended to limit it in any way.

EXAMPLE 1

This example illustrates the reading of data representing a picture from an optical disk, according to the invention. A roentgen picture contains 2000×2000 pixels. Every pixel contains 12 bits. Each picture, therefore, contains 48 Mbit=6 Mbyte.

Reading the picture from a conventional optical disk, having an addressing time of 70 msec, and a data reading rate of 1.25 Mbyte/sec, requires a time of:

[6 MByte/(1.25 Mbyte/sec)]+0.07 sec=4.87 sec.

Reading the picture from a system according to the invention, having an addressing time of 15 msec, and a data reading rate of 20 Mbyte/sec, requires a time of:

[6 MByte/(20 Mbyte/sec)]+0.015 sec=0.315 sec.

Therefore, the invention permits the reading of such a picture at a speed greater by one order of magnitude.

EXAMPLE 2

Figure 13:
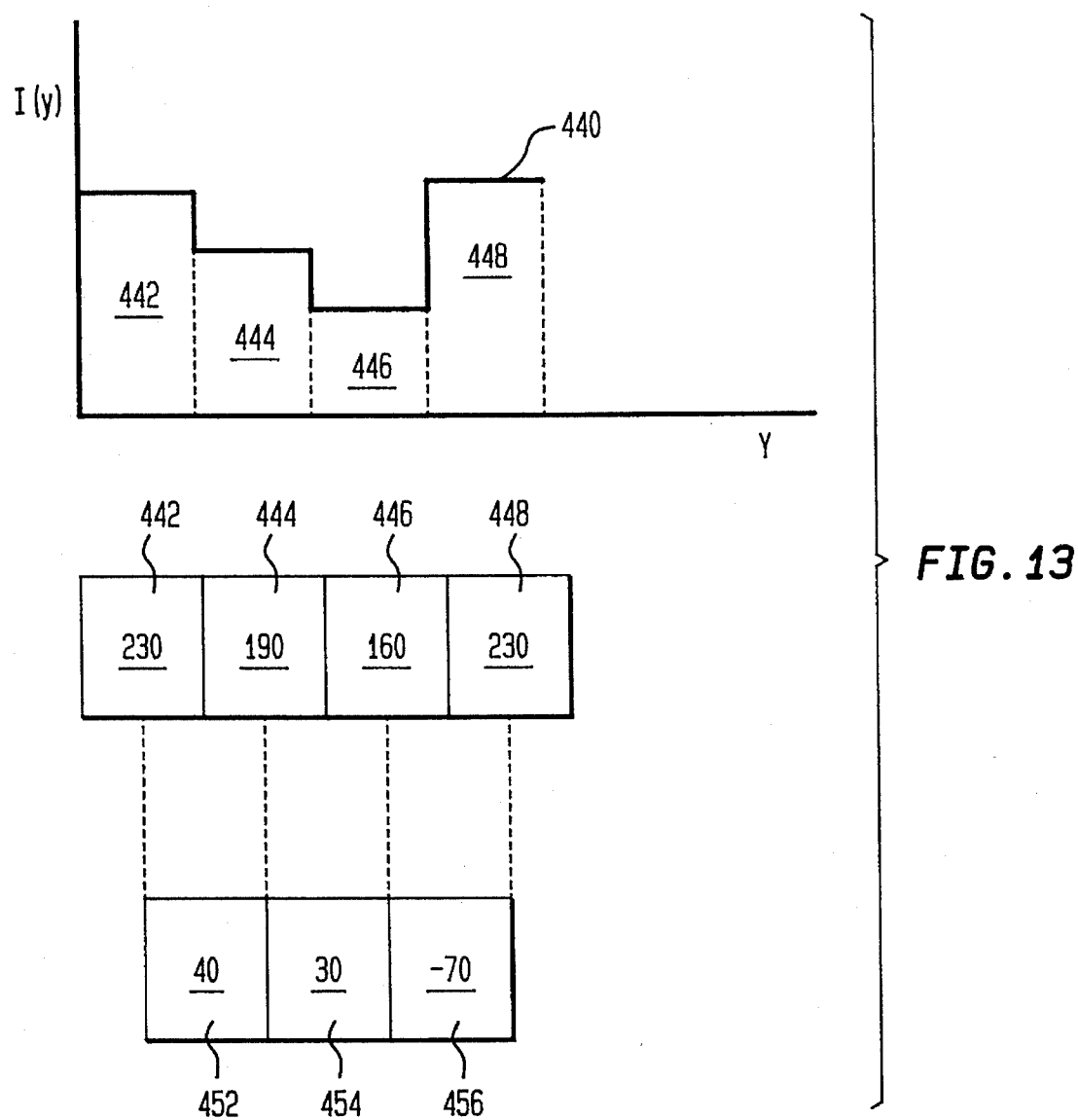
FIG. 13 illustrates the peak detection process.

FIG. 13 shows a digitized image function 440 of four pixels:

Pixel 442 has a value of 230;

Pixel 444 has a value of 190;

Pixel 446 has a value of 160;

Pixel 448 has a value of 230; and

Applying the First Difference to this signal produces four new pixels with signed values and shifted in space by half a pixel: Pixel 452 represents the difference between pixels 442 and 444 and thus is located in space exactly between them. It has a value of 40. Similarly, Pixel 454 has a value of 30, Pixel 456 has a value of −70.

The zero cross lies between pixels 454 and 456, viz., within Pixel 446. The exact location is 30/(30+70)=0.3 pixel.

Hence, the minimum is located at pixel 446, 0.3 pixel from its left boundary.

EXAMPLE 3

Figure 14:
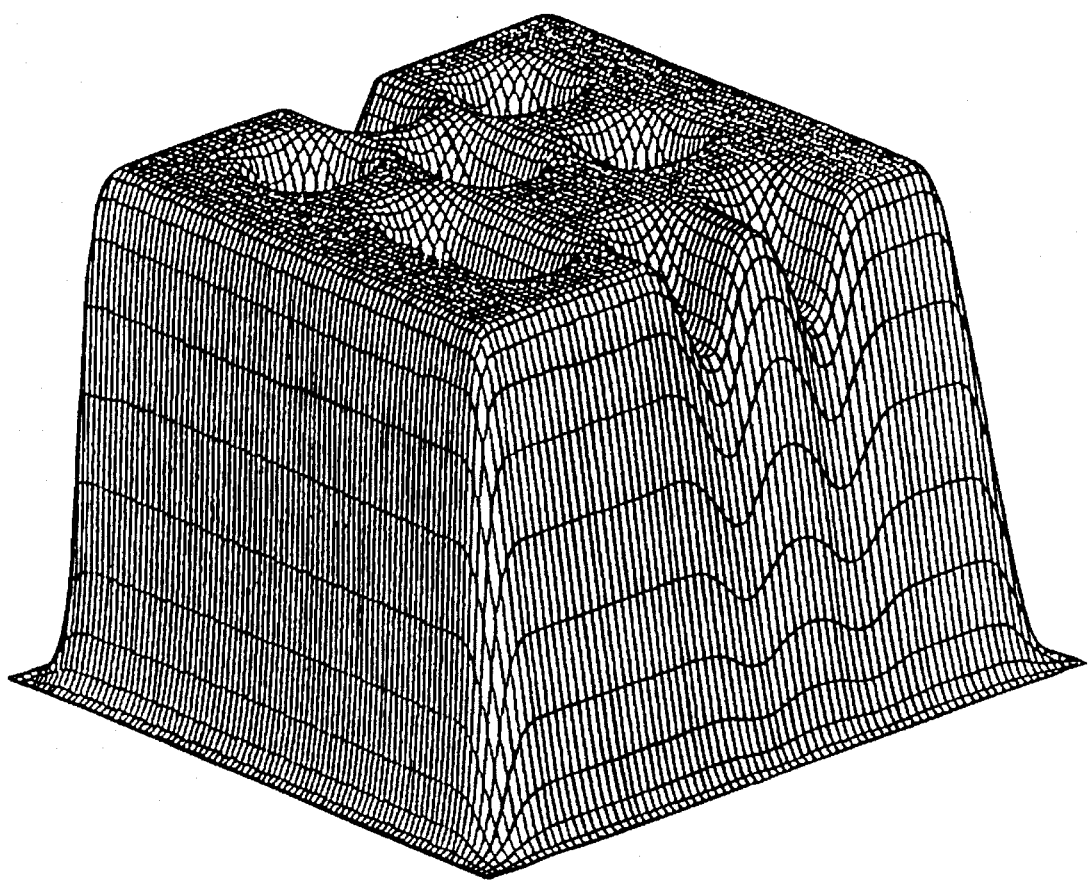
FIGS. 14–15 relate to the examples.
Figure 15:
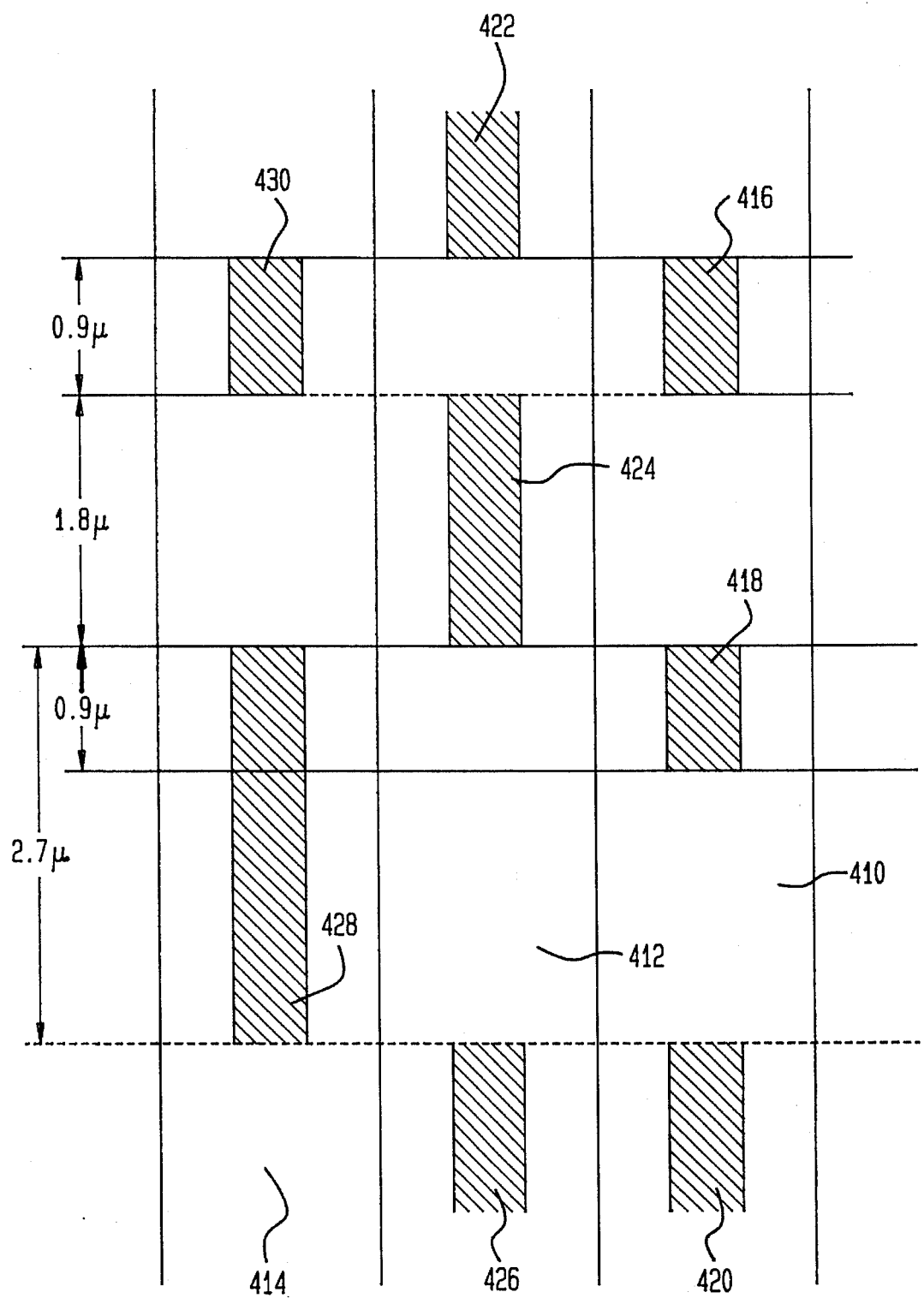

FIG. 14 shows the simulation of a segment of the tracks. FIG. 15 gives an overview of FIG. 14. Table 1 is the conversion of this image into digitized values. First we determine which column of pixels in each track represents the track data center.

Applying the First Difference operator 400 produces the array of values given in Table 2. The position of the zero-crossings are now computed, where values between two adjacent columns are changing from negative to positive. A 1:3 linear interpolation is used in this example, resulting in the array shown in Table 3. A value of 1 in the said table represents the center of the data in its track. In this example, columns 5, 8 and 10 were selected. Once the center of each track was determined, the data itself was identified. The DOG operator 300 was applied to the same data given in Table 1, with a kernel width of five. The array of values given by Table 4 is produced. Now, zero-crossings are searched for along each center track, as determined in the tracking mode (columns 5, 8 and 10). Again, a 3:1 linear interpolation is applied to determine the edge location, resulting in the array shown in Table 5.

In the smallest spot segments (2 spot strings) and error of 0.232 μm is noted in the computation.

The PPD algorithm is now applied to the new data in Table 1, and the DOG operator is applied. The results are shown in Table 6. Applying the 1:3 linear interpolator yields the accurate results shown in Table 7.

All the above description of preferred embodiments have been given for the purpose of illustration and is not intended to constitute a limitation of the invention. Many different reading apparatuses, containing different optical parts, data processing means and additional devices, may be devised, for different purposes and systems, without exceeding the scope of the invention.

TABLE 1

| | col 000 | 1 | 2 | 3 | 4 | 5 | 6 | 7 | 8 | 9 | col 010 | 11 | 12 | 13 | 14 | col 15 | |
| --- | --- | --- | --- | --- | --- | --- | --- | --- | --- | --- | --- | --- | --- | --- | --- | --- | --- |
| row00: | 255 | 255 | 255 | 255 | 255 | 255 | 255 | 255 | 255 | 255 | 255 | 255 | 255 | 255 | 255 | 255 | track |
| row01: | 255 | 255 | 255 | 255 | 255 | 255 | 255 | 247 | 245 | 255 | 255 | 255 | 255 | 255 | 255 | 255 | direction |
| row02: | 255 | 255 | 255 | 255 | 255 | 255 | 255 | 233 | 226 | 254 | 255 | 255 | 255 | 255 | 255 | 255 | ↑ |
| row03: | 255 | 255 | 255 | 255 | 255 | 255 | 254 | 226 | 216 | 252 | 255 | 255 | 255 | 255 | 255 | 255 | |
| row04: | 255 | 255 | 255 | 255 | 255 | 255 | 254 | 225 | 216 | 252 | 255 | 255 | 255 | 255 | 255 | 255 | |
| row05: | 255 | 255 | 255 | 255 | 255 | 254 | 254 | 225 | 216 | 252 | 255 | 255 | 255 | 255 | 255 | 255 | |
| row06: | 255 | 255 | 255 | 255 | 247 | 237 | 252 | 229 | 221 | 252 | 240 | 243 | 255 | 255 | 255 | 255 | |
| row07: | 255 | 255 | 255 | 255 | 221 | 178 | 244 | 243 | 239 | 250 | 189 | 205 | 254 | 255 | 255 | 255 | |
| row08: | 255 | 255 | 255 | 255 | 201 | 134 | 239 | 253 | 252 | 248 | 152 | 176 | 253 | 255 | 255 | 255 | |
| row09: | 255 | 255 | 255 | 255 | 212 | 158 | 242 | 247 | 245 | 249 | 172 | 191 | 253 | 255 | 255 | 255 | |
| row10: | 255 | 255 | 255 | 255 | 240 | 221 | 250 | 233 | 226 | 251 | 226 | 233 | 254 | 255 | 255 | 255 | |
| row11: | 255 | 255 | 255 | 255 | 254 | 252 | 254 | 226 | 216 | 252 | 253 | 253 | 255 | 255 | 255 | 255 | |
| row12: | 255 | 255 | 255 | 255 | 255 | 255 | 254 | 225 | 216 | 252 | 255 | 255 | 255 | 255 | 255 | 255 | |
| row13: | 255 | 255 | 255 | 255 | 255 | 255 | 254 | 225 | 216 | 252 | 255 | 255 | 255 | 255 | 255 | 255 | |
| row14: | 255 | 255 | 255 | 255 | 252 | 249 | 253 | 229 | 221 | 252 | 240 | 243 | 255 | 255 | 255 | 255 | |
| row15: | 255 | 255 | 255 | 255 | 243 | 228 | 251 | 243 | 239 | 250 | 189 | 205 | 254 | 255 | 255 | 255 | |
| row16: | 255 | 255 | 255 | 255 | 236 | 212 | 249 | 253 | 253 | 248 | 152 | 176 | 253 | 255 | 255 | 255 | |
| row17: | 255 | 255 | 255 | 255 | 235 | 209 | 249 | 255 | 255 | 250 | 172 | 191 | 253 | 255 | 255 | 255 | |
| row18: | 255 | 255 | 255 | 255 | 235 | 209 | 249 | 255 | 255 | 253 | 226 | 233 | 254 | 255 | 255 | 255 | |
| row19: | 255 | 255 | 255 | 255 | 235 | 209 | 249 | 255 | 255 | 255 | 253 | 253 | 255 | 255 | 255 | 255 | |

TABLE 1-continued

| | col 000 | 1 | 2 | 3 | 4 | 5 | 6 | 7 | 8 | 9 | col 010 | 11 | 12 | 13 | 14 | col 15 |
|---|---|---|---|---|---|---|---|---|---|---|---|---|---|---|---|---|
| row20: | 255 | 255 | 255 | 255 | 235 | 209 | 249 | 255 | 255 | 255 | 255 | 255 | 255 | 255 | 255 | 255 |
| row21: | 255 | 255 | 255 | 255 | 235 | 209 | 249 | 255 | 255 | 255 | 255 | 255 | 255 | 255 | 255 | 255 |
| row22: | 255 | 255 | 255 | 255 | 237 | 215 | 250 | 251 | 250 | 254 | 250 | 251 | 255 | 255 | 255 | 255 |
| row23: | 255 | 255 | 255 | 255 | 247 | 236 | 252 | 237 | 232 | 252 | 232 | 237 | 255 | 255 | 255 | 255 |
| row24: | 255 | 255 | 255 | 255 | 254 | 252 | 254 | 227 | 218 | 250 | 218 | 227 | 254 | 255 | 255 | 255 |
| row25: | 255 | 255 | 255 | 255 | 255 | 255 | 254 | 225 | 216 | 250 | 216 | 225 | 254 | 255 | 255 | 255 |
| row26: | 255 | 255 | 255 | 255 | 255 | 255 | 254 | 225 | 216 | 250 | 216 | 225 | 254 | 255 | 255 | 255 |
| row27: | 255 | 255 | 255 | 255 | 255 | 255 | 255 | 229 | 219 | 253 | 219 | 229 | 255 | 255 | 255 | 255 |
| row28: | 255 | 255 | 255 | 255 | 255 | 255 | 255 | 243 | 237 | 255 | 237 | 243 | 255 | 255 | 255 | 255 |
| row29: | 255 | 255 | 255 | 255 | 255 | 255 | 255 | 253 | 254 | 255 | 254 | 253 | 255 | 255 | 255 | 255 |

TABLE 2

| | col 000 | | | | | | | | | | col 010 | | | | | |
|---|---|---|---|---|---|---|---|---|---|---|---|---|---|---|---|---|
| row00: | 000 | 000 | 000 | 000 | 000 | 000 | 000 | 000 | 000 | 000 | 000 | 000 | 000 | 000 | 000 | 000 |
| row01: | 000 | 000 | 000 | 000 | 000 | 000 | 000 | −08 | −02 | 010 | 000 | 000 | 000 | 000 | 000 | 000 |
| row02: | 000 | 000 | 000 | 000 | 000 | 000 | 000 | −22 | −07 | 028 | 001 | 000 | 000 | 000 | 000 | 000 |
| row03: | 000 | 000 | 000 | 000 | 000 | 000 | −06 | −23 | −10 | 036 | 003 | 000 | 000 | 000 | 000 | 000 |
| row04: | 000 | 000 | 000 | 000 | 000 | 000 | −01 | −29 | −09 | 036 | 003 | 000 | 000 | 000 | 000 | 000 |
| row05: | 000 | 000 | 000 | 000 | 000 | −01 | 000 | −29 | −09 | 036 | 003 | 000 | 000 | 000 | 000 | 000 |
| row06: | 000 | 000 | 000 | 000 | −08 | −10 | 015 | −23 | −08 | 031 | −12 | 003 | 012 | 000 | 000 | 000 |
| row07: | 000 | 000 | 000 | 000 | −34 | −43 | 066 | −01 | −04 | 011 | −61 | 016 | 049 | 001 | 000 | 000 |
| row08: | 000 | 000 | 000 | 000 | −54 | −67 | 105 | 014 | −01 | −04 | −96 | 024 | 077 | 002 | 000 | 000 |
| row09: | 000 | 000 | 000 | 000 | −43 | −54 | 084 | 005 | −02 | 004 | −77 | 019 | 062 | 002 | 000 | 000 |
| row10: | 000 | 000 | 000 | 000 | −15 | −19 | 029 | −17 | −07 | 025 | −25 | 007 | 021 | 001 | 000 | 000 |
| row11: | 000 | 000 | 000 | 000 | −01 | −02 | 002 | −28 | −10 | 036 | 001 | 000 | 002 | 000 | 000 | 000 |
| row12: | 000 | 000 | 000 | 000 | 000 | 000 | −01 | −29 | −09 | 036 | 003 | 000 | 000 | 000 | 000 | 000 |
| row13: | 000 | 000 | 000 | 000 | 000 | 000 | −01 | −29 | −09 | 036 | 003 | 000 | 000 | 000 | 000 | 000 |
| row14: | 000 | 000 | 000 | 000 | −03 | −03 | 004 | −24 | −08 | 031 | −12 | 003 | 012 | 000 | 000 | 000 |
| row15: | 000 | 000 | 000 | 000 | −12 | −15 | 023 | −08 | −04 | 011 | −61 | 016 | 049 | 001 | 000 | 000 |
| row16: | 000 | 000 | 000 | 000 | −19 | −24 | 037 | 004 | 000 | −05 | −96 | 024 | 077 | 002 | 000 | 000 |
| row17: | 000 | 000 | 000 | 000 | −20 | −26 | 040 | 006 | 000 | −05 | −78 | 019 | 062 | 002 | 000 | 000 |
| row18: | 000 | 000 | 000 | 000 | −20 | −26 | 040 | 006 | 000 | −02 | −27 | 007 | 021 | 001 | 000 | 000 |
| row19: | 000 | 000 | 000 | 000 | −20 | −26 | 040 | 006 | 000 | −02 | 000 | 002 | 000 | 000 | 000 | 000 |
| row20: | 000 | 000 | 000 | 000 | −20 | −26 | 040 | 006 | 000 | 000 | 000 | 000 | 000 | 000 | 000 | 000 |
| row21: | 000 | 000 | 000 | 000 | −20 | −26 | 040 | 006 | 000 | 000 | 000 | 000 | 000 | 000 | 000 | 000 |
| row22: | 000 | 000 | 000 | 000 | −18 | −22 | 035 | 001 | −01 | 004 | −04 | 001 | 004 | 000 | 000 | 000 |
| row23: | 000 | 000 | 000 | 000 | −08 | −11 | 016 | −15 | −05 | 020 | −20 | 005 | 018 | 000 | 000 | 000 |
| row24: | 000 | 000 | 000 | 000 | −01 | −02 | 002 | −27 | −09 | 032 | −32 | 009 | 027 | 001 | 000 | 000 |
| row25: | 000 | 000 | 000 | 000 | 000 | 000 | −01 | −29 | −09 | 034 | −34 | 009 | 029 | 001 | 000 | 000 |
| row26: | 000 | 000 | 000 | 000 | 000 | 000 | −01 | −29 | −09 | 034 | −34 | 009 | 029 | 001 | 000 | 000 |
| row27: | 000 | 000 | 000 | 000 | 000 | 000 | 000 | −26 | −10 | 034 | −34 | 010 | 026 | 000 | 000 | 000 |
| row28: | 000 | 000 | 000 | 000 | 000 | 000 | 000 | −12 | −06 | 018 | −18 | 006 | 012 | 000 | 000 | 000 |
| row29: | 000 | 000 | 000 | 000 | 000 | 000 | 000 | −02 | 001 | 001 | −01 | −01 | 002 | 000 | 000 | 000 |

TABLE 3

| | col 000 | | | | | | | | | | col 010 | | | | | | | 17 | | | col 020 | | | |
|---|---|---|---|---|---|---|---|---|---|---|---|---|---|---|---|---|---|---|---|---|---|---|---|---|
| row00: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row01: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row02: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row03: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row04: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row05: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row06: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row07: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row08: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row09: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row10: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row11: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row12: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row13: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row14: | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |

TABLE 3-continued

| | col 24 | | | | | | | col 030 | | | | | 32 | | | | | col 040 | | | | | | |
|---|---|---|---|---|---|---|---|---|---|---|---|---|---|---|---|---|---|---|---|---|---|---|---|---|
| row15: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row16: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row17: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row18: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row19: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row20: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row21: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row22: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row23: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row24: | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| row25: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row26: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row27: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row28: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row29: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

| | col 24 | | | | | | | col 030 | | | | | 32 | | | | | col 040 | | | | | | |
|---|---|---|---|---|---|---|---|---|---|---|---|---|---|---|---|---|---|---|---|---|---|---|---|---|
| row00: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row01: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row02: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row03: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row04: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row05: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row06: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row07: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row08: | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row09: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row10: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row11: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row12: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row13: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row14: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row15: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row16: | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row17: | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row18: | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row19: | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| row20: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row21: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| row22: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row23: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row24: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row25: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row26: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row27: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row28: | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| row29: | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |

TABLE 4

| | col 000 | | | | | 5 | | | 8 | | col 010 | | | | | |
|---|---|---|---|---|---|---|---|---|---|---|---|---|---|---|---|---|
| row00: | −01 | −01 | −01 | −01 | −01 | −01 | −01 | −30 | −40 | −02 | −01 | −01 | −01 | −01 | −01 | −01 |
| row01: | −01 | −01 | −01 | −01 | −01 | −01 | −10 | −17 | −25 | −04 | −01 | −01 | −01 | −01 | −01 | −01 |
| row02: | −01 | −01 | −01 | −01 | −01 | −01 | 002 | 018 | 025 | −01 | −01 | −01 | −01 | −01 | −01 | −01 |
| row03: | −01 | −01 | −01 | −01 | −01 | −02 | 011 | 028 | 040 | 004 | −01 | −01 | −01 | −01 | −01 | −01 |
| row04: | −01 | −01 | −01 | −01 | −13 | −28 | 002 | 019 | 024 | 003 | −24 | −19 | −01 | −01 | −01 | −01 |
| row05: | −01 | −01 | −01 | −01 | −50 | −110 | −23 | 028 | 034 | −03 | −96 | −73 | −02 | −01 | −01 | −01 |
| row06: | −01 | −01 | −01 | −01 | −50 | −110 | −14 | 026 | 034 | −05 | −94 | −72 | −03 | −01 | −01 | −01 |
| row07: | −01 | −01 | −01 | −01 | 036 | 080 | 011 | −20 | −24 | 002 | 070 | 052 | −01 | −01 | −01 | −01 |
| row08: | −01 | −01 | −01 | −01 | 117 | 262 | 033 | −61 | −79 | 009 | 224 | 171 | 004 | −01 | −01 | −01 |
| row09: | −01 | −01 | −01 | −01 | 071 | 158 | 019 | −35 | −49 | 006 | 136 | 105 | 004 | −01 | −01 | −01 |
| row10: | −01 | −01 | −01 | −01 | −30 | −65 | −09 | 015 | 020 | −03 | −55 | −42 | 001 | −01 | −01 | −01 |
| row11: | −01 | −01 | −01 | −01 | −58 | −128 | −17 | 028 | 040 | −04 | −111 | −85 | −03 | −01 | −01 | −01 |
| row12: | −01 | −01 | −01 | −01 | −28 | −62 | −08 | 019 | 024 | −02 | −69 | −53 | −02 | −01 | −01 | −01 |
| row13: | −01 | −01 | −01 | −01 | −19 | −44 | −04 | 028 | 034 | −03 | −100 | −76 | −02 | −01 | −01 | −01 |
| row14: | −01 | −01 | −01 | −01 | −17 | −40 | −04 | 026 | 035 | −05 | −94 | −72 | −03 | −01 | −01 | −01 |
| row15: | −01 | −01 | −01 | −01 | 005 | 010 | 002 | −07 | −09 | 003 | 070 | 052 | −01 | −01 | −01 | −01 |
| row16: | −01 | −01 | −01 | −01 | 020 | 046 | 005 | −30 | −41 | 012 | 224 | 171 | 004 | −01 | −01 | −01 |
| row17: | −01 | −01 | −01 | −01 | 012 | 029 | 003 | −18 | −24 | 007 | 136 | 105 | 004 | −01 | −01 | −01 |
| row18: | −01 | −01 | −01 | −01 | 002 | 005 | 001 | −03 | −03 | −04 | −55 | −42 | 001 | −01 | −01 | −01 |

TABLE 4-continued

| | col 000 | | | | | 5 | | | 8 | | col 010 | | | | | |
|---|---|---|---|---|---|---|---|---|---|---|---|---|---|---|---|---|
| row19: | −01 | −01 | −01 | −01 | 001 | 001 | 001 | −01 | −01 | −07 | −111 | −85 | −03 | −01 | −01 | −01 |
| row20: | −01 | −01 | −01 | −01 | 003 | 010 | 002 | −06 | −08 | −05 | −53 | −40 | −02 | −01 | −01 | −01 |
| row21: | −01 | −01 | −01 | −01 | 018 | 040 | 004 | −26 | −34 | −04 | −37 | −30 | −01 | −01 | −01 | −01 |
| row22: | −01 | −01 | −01 | −01 | 019 | 040 | 004 | −26 | −35 | −04 | −35 | −26 | −02 | −01 | −01 | −01 |
| row23: | −01 | −01 | −01 | −01 | −05 | −10 | −02 | 007 | 009 | 002 | 009 | 007 | −01 | −01 | −01 | −01 |
| row24: | −01 | −01 | −01 | −01 | −22 | −46 | −05 | 030 | 041 | 005 | 041 | 030 | 001 | −01 | −01 | −01 |
| row25: | −01 | −01 | −01 | −01 | −12 | −29 | −02 | 024 | 029 | 008 | 029 | 024 | 003 | −01 | −01 | −01 |
| row26: | −01 | −01 | −01 | −01 | −02 | −05 | 001 | 030 | 035 | 006 | 035 | 030 | 001 | −01 | −01 | −01 |
| row27: | −01 | −01 | −01 | −01 | −01 | −01 | −01 | 026 | 042 | −01 | 042 | 026 | −01 | −01 | −01 | −01 |
| row28: | −01 | −01 | −01 | −01 | −01 | −01 | −02 | −10 | −06 | −07 | −06 | −10 | −02 | −01 | −01 | −01 |
| row29: | −01 | −01 | −01 | −01 | −01 | −01 | −01 | −32 | −45 | −03 | −45 | −32 | −01 | −01 | −01 | −01 |

TABLE 5

| | col 000 | | | | | 5 | | | 8 | | col 010 | | | | | | |
|---|---|---|---|---|---|---|---|---|---|---|---|---|---|---|---|---|---|
| row00: | 0 | 0 | 0 | 0 | 0 | 0 | 0 | 0 | 0 | 0 | 0 | 0 | 0 | 0 | 0 | 0 | |
| row01: | 0 | 0 | 0 | 0 | 0 | 0 | 0 | 0 | 0 | 0 | 0 | 0 | 0 | 0 | 0 | 0 | |
| row02: | 0 | 0 | 0 | 0 | 0 | 0 | 0 | 0 | 0 | 0 | 0 | 0 | 0 | 0 | 0 | 0 | |
| row03: | 0 | 0 | 0 | 0 | 0 | 0 | 0 | 0 | 0 | 0 | 0 | 0 | 0 | 0 | 0 | 0 | |
| row04: | 0 | 0 | 0 | 0 | 0 | 0 | 0 | 0 | 0 | 0 | 0 | 0 | 0 | 0 | 0 | 0 | |
| row05: | 0 | 0 | 0 | 0 | 0 | 0 | 0 | 1 | 1 | 0 | 0 | 0 | 0 | 0 | 0 | 0 | |
| row06: | 0 | 0 | 0 | 0 | 0 | 0 | 1 | 1 | 1 | 0 | 0 | 0 | 0 | 0 | 0 | 0 | |
| row07: | 0 | 0 | 0 | 0 | 0 | 0 | 1 | 1 | 1 | 1 | 0 | 0 | 0 | 0 | 0 | 0 | |
| row08: | 0 | 0 | 0 | 0 | 0 | 0 | 1 | 1 | 1 | 1 | 0 | 0 | 0 | 0 | 0 | 0 | |
| row09: | 0 | 0 | 0 | 0 | 0 | 0 | 1 | 1 | 1 | 1 | 0 | 0 | 0 | 0 | 0 | 0 | |
| row10: | 0 | 0 | 0 | 0 | 0 | 0 | 1 | 1 | 1 | 1 | 0 | 0 | 0 | 0 | 0 | 0 | |
| row11: | 0 | 0 | 0 | 0 | 0 | 0 | 1 | 1 | 1 | 1 | 0 | 0 | 0 | 0 | 0 | 0 | |
| row12: | 0 | 0 | 0 | 0 | 0 | 0 | 1 | 1 | 1 | 1 | 0 | 0 | 0 | 0 | 0 | 0 | |
| row13: | 0 | 0 | 0 | 0 | 0 | 0 | 0 | 1 | 1 | 1 | 0 | 0 | 0 | 0 | 0 | 0 | |
| row14: | 0 | 0 | 0 | 0 | 0 | 0 | 0 | 1 | 1 | 0 | 0 | 0 | 0 | 0 | 0 | 0 | |
| row15: | 0 | 0 | 0 | 0 | 0 | 0 | 0 | 1 | 1 | 0 | 0 | 0 | 0 | 0 | 0 | 0 | |
| row16: | 0 | 0 | 0 | 0 | 0 | 0 | 0 | 1 | 1 | 0 | 0 | 0 | 0 | 0 | 0 | 0 | |
| row17: | 0 | 0 | 0 | 0 | 0 | 0 | 0 | 1 | 1 | 0 | 0 | 0 | 0 | 0 | 0 | 0 | |
| row18: | 0 | 0 | 0 | 0 | 0 | 0 | 0 | 1 | 1 | 0 | 0 | 0 | 0 | 0 | 0 | 0 | |
| row19: | 0 | 0 | 0 | 0 | 0 | 0 | 0 | 1 | 1 | 0 | 0 | 0 | 0 | 0 | 0 | 0 | |
| row20: | 0 | 0 | 0 | 0 | 1 | 1 | 1 | 0 | 0 | 0 | 1 | 1 | 0 | 0 | 0 | 0 | 10 = 1.132μ |
| row21: | 0 | 0 | 0 | 0 | 1 | 1 | 1 | 0 | 0 | 1 | 1 | 1 | 0 | 0 | 0 | 0 | (7.95) (0.9μ) |
| row22: | 0 | 0 | 0 | 0 | 1 | 1 | 1 | 0 | 0 | 1 | 1 | 1 | 1 | 0 | 0 | 0 | |
| row23: | 0 | 0 | 0 | 0 | 1 | 1 | 1 | 0 | 0 | 1 | 1 | 1 | 1 | 0 | 0 | 0 | |
| row24: | 0 | 0 | 0 | 0 | 1 | 1 | 1 | 0 | 0 | 1 | 1 | 1 | 1 | 0 | 0 | 0 | |
| row25: | 0 | 0 | 0 | 0 | 1 | 1 | 1 | 0 | 0 | 1 | 1 | 1 | 1 | 0 | 0 | 0 | |
| row26: | 0 | 0 | 0 | 0 | 1 | 1 | 1 | 0 | 0 | 1 | 1 | 1 | 1 | 0 | 0 | 0 | |
| row27: | 0 | 0 | 0 | 0 | 1 | 1 | 1 | 0 | 0 | 1 | 1 | 1 | 1 | 0 | 0 | 0 | |
| row28: | 0 | 0 | 0 | 0 | 1 | 1 | 1 | 0 | 0 | 1 | 1 | 1 | 1 | 0 | 0 | 0 | |
| row29: | 0 | 0 | 0 | 0 | 1 | 1 | 1 | 0 | 0 | 1 | 1 | 1 | 1 | 0 | 0 | 0 | |
| row30: | 0 | 0 | 0 | 0 | 0 | 0 | 0 | 1 | 1 | 0 | 0 | 0 | 1 | 0 | 0 | 0 | 15 = 1.697μ |
| row31: | 0 | 0 | 0 | 0 | 0 | 0 | 0 | 1 | 1 | 0 | 0 | 0 | 0 | 0 | 0 | 0 | (15.88) (1.8μ) |
| row32: | 0 | 0 | 0 | 0 | 0 | 0 | 0 | 1 | 1 | 0 | 0 | 0 | 0 | 0 | 0 | 0 | 14 = 1.587μ |
| row33: | 0 | 0 | 0 | 0 | 0 | 0 | 0 | 1 | 1 | 0 | 0 | 0 | 0 | 0 | 0 | 0 | |
| row34: | 0 | 0 | 0 | 0 | 0 | 0 | 0 | 1 | 1 | 0 | 0 | 0 | 0 | 0 | 0 | 0 | |
| row35: | 0 | 0 | 0 | 0 | 0 | 0 | 0 | 1 | 1 | 0 | 0 | 0 | 0 | 0 | 0 | 0 | |
| row36: | 0 | 0 | 0 | 0 | 0 | 0 | 0 | 1 | 1 | 0 | 0 | 0 | 0 | 0 | 0 | 0 | |
| row37: | 0 | 0 | 0 | 0 | 0 | 0 | 0 | 1 | 1 | 0 | 0 | 0 | 0 | 0 | 0 | 0 | |
| row38: | 0 | 0 | 0 | 0 | 0 | 0 | 0 | 1 | 1 | 0 | 0 | 0 | 0 | 0 | 0 | 0 | |
| row39: | 0 | 0 | 0 | 0 | 0 | 0 | 0 | 1 | 1 | 0 | 0 | 0 | 0 | 0 | 0 | 0 | |
| row40: | 0 | 0 | 0 | 0 | 0 | 0 | 0 | 1 | 1 | 0 | 0 | 0 | 0 | 0 | 0 | 0 | |
| row41: | 0 | 0 | 0 | 0 | 0 | 0 | 0 | 1 | 1 | 0 | 0 | 0 | 0 | 0 | 0 | 0 | |
| row42: | 0 | 0 | 0 | 0 | 0 | 0 | 0 | 1 | 1 | 0 | 0 | 0 | 0 | 0 | 0 | 0 | |
| row43: | 0 | 0 | 0 | 0 | 0 | 0 | 0 | 1 | 1 | 0 | 0 | 0 | 0 | 0 | 0 | 0 | |
| row44: | 0 | 0 | 0 | 0 | 0 | 0 | 0 | 1 | 1 | 1 | 1 | 0 | 0 | 0 | 0 | 0 | |
| row45: | 0 | 0 | 0 | 0 | 1 | 1 | 1 | 0 | 0 | 1 | 1 | 0 | 0 | 0 | 0 | 0 | 10 |
| row46: | 0 | 0 | 0 | 0 | 1 | 1 | 1 | 0 | 0 | 1 | 1 | 1 | 0 | 0 | 0 | 0 | |
| row47: | 0 | 0 | 0 | 0 | 1 | 1 | 1 | 0 | 0 | 1 | 1 | 1 | 0 | 0 | 0 | 0 | |

TABLE 5-continued

| | col 000 | | | | | 5 | | | | 8 | col 010 | | | | | |
|---|---|---|---|---|---|---|---|---|---|---|---|---|---|---|---|---|
| row48: | 0 | 0 | 0 | 0 | 1 | 1 | 1 | 0 | 0 | 1 | 1 | 1 | 1 | 0 | 0 | 0 |
| row49: | 0 | 0 | 0 | 0 | 1 | 1 | 1 | 0 | 0 | 1 | 1 | 1 | 1 | 0 | 0 | 0 |
| row50: | 0 | 0 | 0 | 0 | 1 | 1 | 1 | 0 | 0 | 1 | 1 | 1 | 1 | 0 | 0 | 0 |
| row51: | 0 | 0 | 0 | 0 | 1 | 1 | 1 | 0 | 0 | 1 | 1 | 1 | 1 | 0 | 0 | 0 |
| row52: | 0 | 0 | 0 | 0 | 1 | 1 | 1 | 0 | 0 | 1 | 1 | 1 | 1 | 0 | 0 | 0 |
| row53: | 0 | 0 | 0 | 0 | 1 | 1 | 1 | 0 | 0 | 0 | 1 | 1 | 1 | 0 | 0 | 0 |
| row54: | 0 | 0 | 0 | 0 | 1 | 1 | 1 | 0 | 0 | 0 | 0 | 0 | 1 | 0 | 0 | 0 |
| row55: | 0 | 0 | 0 | 0 | 1 | 1 | 1 | 0 | 0 | 0 | 0 | 0 | 0 | 0 | 0 | 0 |
| row56: | 0 | 0 | 0 | 0 | 1 | 1 | 1 | 0 | 0 | 0 | 0 | 0 | 0 | 0 | 0 | 0 |
| row57: | 0 | 0 | 0 | 0 | 1 | 1 | 1 | 0 | 0 | 0 | 0 | 0 | 0 | 0 | 0 | 0 |
| row58: | 0 | 0 | 0 | 0 | 1 | 1 | 1 | 0 | 0 | 0 | 0 | 0 | 0 | 0 | 0 | 0 |
| row59: | 0 | 0 | 0 | 0 | 1 | 1 | 1 | 0 | 0 | 0 | 0 | 0 | 0 | 0 | 0 | 0 |
| row60: | 0 | 0 | 0 | 0 | 1 | 1 | 1 | 0 | 0 | 0 | 0 | 0 | 0 | 0 | 0 | 0 |
| row61: | 0 | 0 | 0 | 0 | 1 | 1 | 1 | 0 | 0 | 0 | 0 | 0 | 0 | 0 | 0 | 0 |
| row62: | 0 | 0 | 0 | 0 | 1 | 1 | 1 | 0 | 0 | 0 | 0 | 0 | 0 | 0 | 0 | 0 |
| row63: | 0 | 0 | 0 | 0 | 1 | 1 | 1 | 0 | 0 | 0 | 0 | 0 | 0 | 0 | 0 | 0 |
| row64: | 0 | 0 | 0 | 0 | 1 | 1 | 1 | 0 | 0 | 0 | 0 | 0 | 0 | 0 | 0 | 0 |
| row65: | 0 | 0 | 0 | 0 | 1 | 1 | 1 | 0 | 0 | 0 | 0 | 0 | 0 | 0 | 0 | 0 |
| row66: | 0 | 0 | 0 | 0 | 1 | 1 | 1 | 0 | 0 | 0 | 0 | 0 | 0 | 0 | 0 | 0 |
| row67: | 0 | 0 | 0 | 0 | 1 | 1 | 1 | 0 | 0 | 0 | 0 | 0 | 0 | 0 | 0 | 0 |
| row68: | 0 | 0 | 0 | 0 | 1 | 1 | 1 | 0 | 0 | 0 | 0 | 0 | 0 | 0 | 0 | 0 |
| row69: | 0 | 0 | 0 | 0 | 0 | 0 | 0 | 1 | 1 | 1 | 1 | 1 | 0 | 0 | 0 | 0 |
| row70: | 0 | 0 | 0 | 0 | 0 | 0 | 0 | 1 | 1 | 1 | 1 | 1 | 0 | 0 | 0 | 0 |
| row71: | 0 | 0 | 0 | 0 | 0 | 0 | 0 | 1 | 1 | 1 | 1 | 1 | 0 | 0 | 0 | 0 |
| row72: | 0 | 0 | 0 | 0 | 0 | 0 | 0 | 1 | 1 | 1 | 1 | 1 | 0 | 0 | 0 | 0 |
| row73: | 0 | 0 | 0 | 0 | 0 | 0 | 0 | 1 | 1 | 1 | 1 | 1 | 0 | 0 | 0 | 0 |
| row74: | 0 | 0 | 0 | 0 | 0 | 0 | 0 | 1 | 1 | 1 | 1 | 1 | 0 | 0 | 0 | 0 |
| row75: | 0 | 0 | 0 | 0 | 0 | 0 | 0 | 1 | 1 | 1 | 1 | 1 | 0 | 0 | 0 | 0 |
| row76: | 0 | 0 | 0 | 0 | 0 | 0 | 0 | 1 | 1 | 1 | 1 | 1 | 0 | 0 | 0 | 0 |
| row77: | 0 | 0 | 0 | 0 | 0 | 0 | 0 | 1 | 1 | 1 | 1 | 1 | 0 | 0 | 0 | 0 |
| row78: | 0 | 0 | 0 | 0 | 0 | 0 | 1 | 1 | 1 | 1 | 1 | 1 | 0 | 0 | 0 | 0 |
| row79: | 0 | 0 | 0 | 0 | 0 | 0 | 1 | 1 | 1 | 1 | 1 | 1 | 0 | 0 | 0 | 0 |
| row80: | 0 | 0 | 0 | 0 | 0 | 0 | 0 | 1 | 1 | 1 | 1 | 0 | 0 | 0 | 0 | 0 |
| row81: | 0 | 0 | 0 | 0 | 0 | 0 | 0 | 1 | 1 | 0 | 1 | 0 | 0 | 0 | 0 | 0 |
| row82: | 0 | 0 | 0 | 0 | 0 | 0 | 0 | 1 | 1 | 0 | 1 | 0 | 0 | 0 | 0 | 0 |
| row83: | 0 | 0 | 0 | 0 | 0 | 0 | 0 | 1 | 1 | 0 | 1 | 0 | 0 | 0 | 0 | 0 |
| row84: | 0 | 0 | 0 | 0 | 0 | 0 | 0 | 0 | 0 | 0 | 0 | 0 | 0 | 0 | 0 | 0 |
| row85: | 0 | 0 | 0 | 0 | 0 | 0 | 0 | 0 | 0 | 0 | 0 | 0 | 0 | 0 | 0 | 0 |
| row86: | 0 | 0 | 0 | 0 | 0 | 0 | 0 | 0 | 0 | 0 | 0 | 0 | 0 | 0 | 0 | 0 |
| row87: | 0 | 0 | 0 | 0 | 0 | 0 | 0 | 0 | 0 | 0 | 0 | 0 | 0 | 0 | 0 | 0 |
| row88: | 0 | 0 | 0 | 0 | 0 | 0 | 0 | 0 | 0 | 0 | 0 | 0 | 0 | 0 | 0 | 0 |
| row89: | 0 | 0 | 0 | 0 | 0 | 0 | 0 | 0 | 0 | 0 | 0 | 0 | 0 | 0 | 0 | 0 |

Annotation at row54–55: $24 = 2.717\mu$ $(23.82)$ $(2.7\mu)$

TABLE 6

|  | col 000 |  |  |  | 5 |  |  | 8 |  | col 010 |  |  |  |  |  |
|---|---|---|---|---|---|---|---|---|---|---|---|---|---|---|---|
| row00: | −01 | −01 | −01 | −01 | −01 | −01 | −01 | −30 | −40 | −02 | −01 | −01 | −01 | −01 | −01 |
| row01: | −01 | −01 | −01 | −01 | −01 | −01 | −10 | −17 | −25 | −04 | −01 | −01 | −01 | −01 | −01 |
| row02: | −01 | −01 | −01 | −01 | −01 | −01 | 002 | 018 | 025 | −01 | −01 | −01 | −01 | −01 | −01 |
| row03: | −01 | −01 | −01 | −01 | −01 | −02 | 011 | 028 | 040 | 004 | −01 | −01 | −01 | −01 | −01 |
| row04: | −01 | −01 | −01 | −01 | −13 | −28 | 002 | 019 | 024 | 003 | −24 | −19 | −01 | −01 | −01 |
| row05: | −01 | −01 | −01 | −01 | −50 | −110 | −23 | 028 | 034 | −03 | −96 | −73 | −02 | −01 | −01 |
| row06: | −01 | −01 | −01 | −01 | −50 | −110 | −14 | 026 | 034 | −05 | −94 | −72 | −03 | −01 | −01 |
| row07: | −01 | −01 | −01 | −01 | 019 | 042 | 011 | −20 | −13 | 002 | 038 | 028 | −01 | −01 | −01 |
| row08: | −01 | −01 | −01 | −01 | 061 | 043 | 033 | −61 | −79 | 009 | 036 | 028 | 004 | −01 | −01 |
| row09: | −01 | −01 | −01 | −01 | 039 | 088 | 019 | −35 | −28 | 006 | 076 | 058 | 004 | −01 | −01 |
| row10: | −01 | −01 | −01 | −01 | −30 | −65 | −09 | 015 | 020 | −03 | −55 | −42 | 001 | −01 | −01 |
| row11: | −01 | −01 | −01 | −01 | −58 | −128 | −17 | 028 | 040 | −04 | −111 | −85 | −03 | −01 | −01 |
| row12: | −01 | −01 | −01 | −01 | −28 | −62 | −08 | 019 | 024 | −02 | −69 | −53 | −02 | −01 | −01 |
| row13: | −01 | −01 | −01 | −01 | −19 | −44 | −04 | 028 | 034 | −03 | −100 | −76 | −02 | −01 | −01 |
| row14: | −01 | −01 | −01 | −01 | −17 | −40 | −04 | 026 | 035 | −05 | −94 | −72 | −03 | −01 | −01 |
| row15: | −01 | −01 | −01 | −01 | 005 | 010 | 002 | −07 | −09 | 003 | 038 | 028 | −01 | −01 | −01 |
| row16: | −01 | −01 | −01 | −01 | 020 | 046 | 005 | −30 | −41 | 012 | 036 | 028 | 004 | −01 | −01 |
| row17: | −01 | −01 | −01 | −01 | 012 | 029 | 003 | −18 | −24 | 007 | 076 | 058 | 004 | −01 | −01 |
| row18: | −01 | −01 | −01 | −01 | 002 | 005 | 001 | −03 | −03 | −04 | −55 | −42 | 001 | −01 | −01 |
| row19: | −01 | −01 | −01 | −01 | 001 | 001 | 001 | −01 | −01 | −07 | −111 | −85 | −03 | −01 | −01 |
| row20: | −01 | −01 | −01 | −01 | 003 | 010 | 002 | −06 | −08 | −05 | −53 | −40 | −02 | −01 | −01 |
| row21: | −01 | −01 | −01 | −01 | 018 | 040 | 004 | −26 | −34 | −04 | −37 | −30 | −01 | −01 | −01 |
| row22: | −01 | −01 | −01 | −01 | 019 | 040 | 004 | −26 | −35 | −04 | −35 | −26 | −02 | −01 | −01 |
| row23: | −01 | −01 | −01 | −01 | −05 | −10 | −02 | 007 | 009 | 002 | 009 | 007 | −01 | −01 | −01 |
| row24: | −01 | −01 | −01 | −01 | −22 | −46 | −05 | 030 | 041 | 005 | 041 | 030 | 001 | −01 | −01 |
| row25: | −01 | −01 | −01 | −01 | −12 | −29 | −02 | 024 | 029 | 008 | 029 | 024 | 003 | −01 | −01 |
| row26: | −01 | −01 | −01 | −01 | −02 | −05 | 001 | 030 | 035 | 006 | 035 | 030 | 001 | −01 | −01 |
| row27: | −01 | −01 | −01 | −01 | −01 | −01 | −01 | 026 | 042 | −01 | 042 | 026 | −01 | −01 | −01 |
| row28: | −01 | −01 | −01 | −01 | −01 | −01 | −02 | −10 | −06 | −07 | −06 | −10 | −02 | −01 | −01 |
| row29: | −01 | −01 | −01 | −01 | −01 | −01 | −01 | −32 | −45 | −03 | −45 | −32 | −01 | −01 | −01 |

TABLE 7

|  | col 000 |  |  |  | 5 |  |  | 8 |  | col 010 |  |  |  |  |  |  |
|---|---|---|---|---|---|---|---|---|---|---|---|---|---|---|---|---|
| row00: | 0 | 0 | 0 | 0 | 0 | 0 | 0 | 0 | 0 | 0 | 0 | 0 | 0 | 0 | 0 | |
| row01: | 0 | 0 | 0 | 0 | 0 | 0 | 0 | 0 | 0 | 0 | 0 | 0 | 0 | 0 | 0 | |
| row02: | 0 | 0 | 0 | 0 | 0 | 0 | 0 | 0 | 0 | 0 | 0 | 0 | 0 | 0 | 0 | |
| row03: | 0 | 0 | 0 | 0 | 0 | 0 | 0 | 0 | 0 | 0 | 0 | 0 | 0 | 0 | 0 | |
| row04: | 0 | 0 | 0 | 0 | 0 | 0 | 0 | 0 | 0 | 0 | 0 | 0 | 0 | 0 | 0 | |
| row05: | 0 | 0 | 0 | 0 | 0 | 0 | 0 | 1 | 1 | 0 | 0 | 0 | 0 | 0 | 0 | |
| row06: | 0 | 0 | 0 | 0 | 0 | 0 | 1 | 1 | 1 | 0 | 0 | 0 | 0 | 0 | 0 | |
| row07: | 0 | 0 | 0 | 0 | 0 | 0 | 1 | 1 | 1 | 1 | 0 | 0 | 0 | 0 | 0 | |
| row08: | 0 | 0 | 0 | 0 | 0 | 0 | 1 | 1 | 1 | 0 | 0 | 0 | 0 | 0 | 0 | |
| row09: | 0 | 0 | 0 | 0 | 0 | 1 | 1 | 1 | 1 | 0 | 0 | 0 | 0 | 0 | 0 | |
| row10: | 0 | 0 | 0 | 0 | 0 | 1 | 1 | 1 | 1 | 0 | 0 | 0 | 0 | 0 | 0 | |
| row11: | 0 | 0 | 0 | 0 | 0 | 1 | 1 | 1 | 1 | 0 | 0 | 0 | 0 | 0 | 0 | |
| row12: | 0 | 0 | 0 | 0 | 0 | 1 | 1 | 1 | 1 | 0 | 0 | 0 | 0 | 0 | 0 | |
| row13: | 0 | 0 | 0 | 0 | 0 | 0 | 1 | 1 | 1 | 0 | 0 | 0 | 0 | 0 | 0 | |
| row14: | 0 | 0 | 0 | 0 | 0 | 0 | 1 | 1 | 0 | 0 | 0 | 0 | 0 | 0 | 0 | |
| row15: | 0 | 0 | 0 | 0 | 0 | 0 | 1 | 1 | 0 | 0 | 0 | 0 | 0 | 0 | 0 | |
| row16: | 0 | 0 | 0 | 0 | 0 | 0 | 1 | 1 | 0 | 0 | 0 | 0 | 0 | 0 | 0 | |
| row17: | 0 | 0 | 0 | 0 | 0 | 0 | 1 | 1 | 0 | 0 | 0 | 0 | 0 | 0 | 0 | |
| row18: | 0 | 0 | 0 | 0 | 0 | 0 | 1 | 1 | 0 | 0 | 0 | 0 | 0 | 0 | 0 | |
| row19: | 0 | 0 | 0 | 0 | 0 | 0 | 1 | 1 | 0 | 0 | 0 | 0 | 0 | 0 | 0 | |
| row20: | 0 | 0 | 0 | 0 | 0 | 0 | 1 | 0 | 1 | 0 | 0 | 0 | 0 | 0 | 0 | |
| row21: | 0 | 0 | 0 | 0 | 1 | 1 | 1 | 0 | 0 | 1 | 1 | 1 | 0 | 0 | 0 | 0 | 8 = 0.906μ |
| row22: | 0 | 0 | 0 | 0 | 1 | 1 | 1 | 0 | 0 | 1 | 1 | 1 | 0 | 0 | 0 | (7.95) (0.9μ) |
| row23: | 0 | 0 | 0 | 0 | 1 | 1 | 1 | 0 | 0 | 1 | 1 | 1 | 0 | 0 | 0 | |
| row24: | 0 | 0 | 0 | 0 | 1 | 1 | 1 | 0 | 0 | 1 | 1 | 1 | 0 | 0 | 0 | |
| row25: | 0 | 0 | 0 | 0 | 1 | 1 | 1 | 0 | 0 | 1 | 1 | 1 | 0 | 0 | 0 | |
| row26: | 0 | 0 | 0 | 0 | 1 | 1 | 1 | 0 | 0 | 1 | 1 | 1 | 0 | 0 | 0 | |
| row27: | 0 | 0 | 0 | 0 | 1 | 1 | 1 | 0 | 0 | 1 | 1 | 1 | 0 | 0 | 0 | |
| row28: | 0 | 0 | 0 | 0 | 1 | 1 | 1 | 0 | 0 | 1 | 1 | 1 | 0 | 0 | 0 | |
| row29: | 0 | 0 | 0 | 0 | 0 | 0 | 1 | 0 | 1 | 1 | 0 | 1 | 0 | 0 | 0 | 16 = 1.811μ |
| row30: | 0 | 0 | 0 | 0 | 0 | 0 | 0 | 1 | 1 | 0 | 0 | 1 | 0 | 0 | 0 | (15.88) (1.8μ) |
| row31: | 0 | 0 | 0 | 0 | 0 | 0 | 0 | 1 | 1 | 0 | 0 | 0 | 0 | 0 | 0 | |
| row32: | 0 | 0 | 0 | 0 | 0 | 0 | 0 | 1 | 1 | 0 | 0 | 0 | 0 | 0 | 0 | |

TABLE 7-continued

| | col 000 | | | | | 5 | | | 8 | | col 010 | | | | | |
|---|---|---|---|---|---|---|---|---|---|---|---|---|---|---|---|---|
| row33: | 0 | 0 | 0 | 0 | 0 | 0 | 0 | 1 | 1 | 0 | 0 | 0 | 0 | 0 | 0 | 0 |
| row34: | 0 | 0 | 0 | 0 | 0 | 0 | 0 | 1 | 1 | 0 | 0 | 0 | 0 | 0 | 0 | 0 |
| row35: | 0 | 0 | 0 | 0 | 0 | 0 | 0 | 1 | 1 | 0 | 0 | 0 | 0 | 0 | 0 | 0 |
| row36: | 0 | 0 | 0 | 0 | 0 | 0 | 0 | 1 | 1 | 0 | 0 | 0 | 0 | 0 | 0 | 0 |
| row37: | 0 | 0 | 0 | 0 | 0 | 0 | 0 | 1 | 1 | 0 | 0 | 0 | 0 | 0 | 0 | 0 |
| row38: | 0 | 0 | 0 | 0 | 0 | 0 | 0 | 1 | 1 | 0 | 0 | 0 | 0 | 0 | 0 | 0 |
| row39: | 0 | 0 | 0 | 0 | 0 | 0 | 0 | 1 | 1 | 0 | 0 | 0 | 0 | 0 | 0 | 0 |
| row40: | 0 | 0 | 0 | 0 | 0 | 0 | 0 | 1 | 1 | 0 | 0 | 0 | 0 | 0 | 0 | 0 |
| row41: | 0 | 0 | 0 | 0 | 0 | 0 | 0 | 1 | 1 | 0 | 0 | 0 | 0 | 0 | 0 | 0 |
| row42: | 0 | 0 | 0 | 0 | 0 | 0 | 0 | 1 | 1 | 0 | 0 | 0 | 0 | 0 | 0 | 0 |
| row43: | 0 | 0 | 0 | 0 | 0 | 0 | 0 | 1 | 1 | 0 | 0 | 0 | 0 | 0 | 0 | 0 |
| row44: | 0 | 0 | 0 | 0 | 0 | 0 | 0 | 1 | 1 | 1 | 0 | 0 | 0 | 0 | 0 | 0 |
| row45: | 0 | 0 | 0 | 0 | 1 | 1 | 1 | 0 | 0 | 1 | 1 | 1 | 0 | 0 | 0 | 0 | 8
| row46: | 0 | 0 | 0 | 0 | 1 | 1 | 1 | 0 | 0 | 1 | 1 | 1 | 0 | 0 | 0 | 0 |
| row47: | 0 | 0 | 0 | 0 | 1 | 1 | 1 | 0 | 0 | 1 | 1 | 1 | 0 | 0 | 0 | 0 |
| row48: | 0 | 0 | 0 | 0 | 1 | 1 | 1 | 0 | 0 | 1 | 1 | 1 | 0 | 0 | 0 | 0 |
| row49: | 0 | 0 | 0 | 0 | 1 | 1 | 1 | 0 | 0 | 1 | 1 | 1 | 0 | 0 | 0 | 0 |
| row50: | 0 | 0 | 0 | 0 | 1 | 1 | 1 | 0 | 0 | 1 | 1 | 1 | 0 | 0 | 0 | 0 |
| row51: | 0 | 0 | 0 | 0 | 1 | 1 | 1 | 0 | 0 | 1 | 1 | 1 | 0 | 0 | 0 | 0 |
| row52: | 0 | 0 | 0 | 0 | 1 | 1 | 1 | 0 | 0 | 1 | 1 | 1 | 0 | 0 | 0 | 0 |
| row53: | 0 | 0 | 0 | 0 | 1 | 1 | 1 | 0 | 0 | 0 | 0 | 1 | 0 | 0 | 0 | 0 | 24 = 2.717
| row54: | 0 | 0 | 0 | 0 | 1 | 1 | 1 | 0 | 0 | 0 | 0 | 1 | 0 | 0 | 0 | 0 | (23.82) (2.7μ)
| row55: | 0 | 0 | 0 | 0 | 1 | 1 | 1 | 0 | 0 | 0 | 0 | 0 | 0 | 0 | 0 | 0 | 16
| row56: | 0 | 0 | 0 | 0 | 1 | 1 | 1 | 0 | 0 | 0 | 0 | 0 | 0 | 0 | 0 | 0 |
| row57: | 0 | 0 | 0 | 0 | 1 | 1 | 1 | 0 | 0 | 0 | 0 | 0 | 0 | 0 | 0 | 0 |
| row58: | 0 | 0 | 0 | 0 | 1 | 1 | 1 | 0 | 0 | 0 | 0 | 0 | 0 | 0 | 0 | 0 |
| row59: | 0 | 0 | 0 | 0 | 1 | 1 | 1 | 0 | 0 | 0 | 0 | 0 | 0 | 0 | 0 | 0 |
| row60: | 0 | 0 | 0 | 0 | 1 | 1 | 1 | 0 | 0 | 0 | 0 | 0 | 0 | 0 | 0 | 0 |
| row61: | 0 | 0 | 0 | 0 | 1 | 1 | 1 | 0 | 0 | 0 | 0 | 0 | 0 | 0 | 0 | 0 |
| row62: | 0 | 0 | 0 | 0 | 1 | 1 | 1 | 0 | 0 | 0 | 0 | 0 | 0 | 0 | 0 | 0 |
| row63: | 0 | 0 | 0 | 0 | 1 | 1 | 1 | 0 | 0 | 0 | 0 | 0 | 0 | 0 | 0 | 0 |
| row64: | 0 | 0 | 0 | 0 | 1 | 1 | 1 | 0 | 0 | 0 | 0 | 0 | 0 | 0 | 0 | 0 |
| row65: | 0 | 0 | 0 | 0 | 1 | 1 | 1 | 0 | 0 | 0 | 0 | 0 | 0 | 0 | 0 | 0 |
| row66: | 0 | 0 | 0 | 0 | 1 | 1 | 1 | 0 | 0 | 0 | 0 | 0 | 0 | 0 | 0 | 0 |
| row67: | 0 | 0 | 0 | 0 | 1 | 1 | 1 | 0 | 0 | 0 | 0 | 0 | 0 | 0 | 0 | 0 |
| row68: | 0 | 0 | 0 | 0 | 1 | 1 | 1 | 0 | 0 | 0 | 0 | 0 | 0 | 0 | 0 | 0 |
| row69: | 0 | 0 | 0 | 0 | 0 | 0 | 0 | 1 | 1 | 1 | 1 | 1 | 0 | 0 | 0 | 0 |
| row70: | 0 | 0 | 0 | 0 | 0 | 0 | 0 | 1 | 1 | 1 | 1 | 1 | 0 | 0 | 0 | 0 |
| row71: | 0 | 0 | 0 | 0 | 0 | 0 | 0 | 1 | 1 | 1 | 1 | 1 | 0 | 0 | 0 | 0 |
| row72: | 0 | 0 | 0 | 0 | 0 | 0 | 0 | 1 | 1 | 1 | 1 | 1 | 0 | 0 | 0 | 0 |
| row73: | 0 | 0 | 0 | 0 | 0 | 0 | 0 | 1 | 1 | 1 | 1 | 1 | 0 | 0 | 0 | 0 |
| row74: | 0 | 0 | 0 | 0 | 0 | 0 | 0 | 1 | 1 | 1 | 1 | 1 | 0 | 0 | 0 | 0 |
| row75: | 0 | 0 | 0 | 0 | 0 | 0 | 0 | 1 | 1 | 1 | 1 | 1 | 0 | 0 | 0 | 0 |
| row76: | 0 | 0 | 0 | 0 | 0 | 0 | 0 | 1 | 1 | 1 | 1 | 1 | 0 | 0 | 0 | 0 |
| row77: | 0 | 0 | 0 | 0 | 0 | 0 | 0 | 1 | 1 | 1 | 1 | 1 | 0 | 0 | 0 | 0 |
| row78: | 0 | 0 | 0 | 0 | 0 | 0 | 1 | 1 | 1 | 1 | 1 | 1 | 0 | 0 | 0 | 0 |
| row79: | 0 | 0 | 0 | 0 | 0 | 0 | 1 | 1 | 1 | 1 | 1 | 1 | 0 | 0 | 0 | 0 |
| row80: | 0 | 0 | 0 | 0 | 0 | 0 | 0 | 1 | 1 | 1 | 1 | 0 | 0 | 0 | 0 | 0 |
| row81: | 0 | 0 | 0 | 0 | 0 | 0 | 0 | 1 | 1 | 0 | 1 | 1 | 0 | 0 | 0 | 0 |
| row82: | 0 | 0 | 0 | 0 | 0 | 0 | 1 | 1 | 0 | 1 | 1 | 0 | 0 | 0 | 0 | 0 |
| row83: | 0 | 0 | 0 | 0 | 0 | 0 | 1 | 1 | 0 | 1 | 1 | 0 | 0 | 0 | 0 | 0 |
| row84: | 0 | 0 | 0 | 0 | 0 | 0 | 0 | 0 | 0 | 0 | 0 | 0 | 0 | 0 | 0 | 0 |
| row85: | 0 | 0 | 0 | 0 | 0 | 0 | 0 | 0 | 0 | 0 | 0 | 0 | 0 | 0 | 0 | 0 |
| row86: | 0 | 0 | 0 | 0 | 0 | 0 | 0 | 0 | 0 | 0 | 0 | 0 | 0 | 0 | 0 | 0 |
| row87: | 0 | 0 | 0 | 0 | 0 | 0 | 0 | 0 | 0 | 0 | 0 | 0 | 0 | 0 | 0 | 0 |
| row88: | 0 | 0 | 0 | 0 | 0 | 0 | 0 | 0 | 0 | 0 | 0 | 0 | 0 | 0 | 0 | 0 |
| row89: | 0 | 0 | 0 | 0 | 0 | 0 | 0 | 0 | 0 | 0 | 0 | 0 | 0 | 0 | 0 | 0 |

We claim:

1. A method of fast accessing data on an optical disk having a plurality of recorded data regions, comprising the step of reading the data regions from the optical disk by actuating a step and focus unit for focusing a light beam traveling along an optical path to read a plurality of the data regions comprising at least two mirrors which are laterally displaceable along a common optical path of the light beam to both scan the data regions by the light beam and to focus the light beam.

2. A method according to claim 1, wherein each of said mirrors is independently laterally displaceable whereby the step and focus unit can be used both for scanning data and for focusing purposes.

3. A step and focus unit for focusing a light beam traveling along an optical path to read a plurality of recorded data regions on an optical disk comprising at least two mirrors which are laterally displaceable along a common optical path of the light beam.

4. A step and focus unit according to claim 3, wherein each of said mirrors is independently laterally displaceable whereby the unit can be used both for scanning data and for focusing purposes.

* * * * *

UNITED STATES PATENT AND TRADEMARK OFFICE
CERTIFICATE OF CORRECTION

PATENT NO. : 5,537,385
DATED : July 16, 1996
INVENTOR(S) : Alon et al.

It is certified that error appears in the above-identified patent and that said Letters Patent is hereby corrected as shown below:

```
Column 2, line 32, "heat" should read --height--.
Column 3, line 46, "elastomerically" should read
  --electronically--.
Column 8, line 56, "61" should read --68--.
Column 9, line 13, "I(x)G"(x)" should read--
Column 10, line 58, "=1" should read -- -1--.
Columns 15 and 16, TABLE 4, under column 10, row 17, change
  "136" to --136--.
Columns 17 and 18, TABLE 5, under column 10, row 43, change
  "0" to --0--.
Columns 17 and 18, TABLE 5, under column 5, row 44, change
  "0" to --0--.
Columns 17 and 18, TABLE 5, under column 8, row 44, change
  "1" to --1--.
```

Signed and Sealed this

Nineteenth Day of November, 1996

*Attest:*

BRUCE LEHMAN

*Attesting Officer*   *Commissioner of Patents and Trademarks*